United States Patent
Nixon et al.

(10) Patent No.: US 9,207,666 B2
(45) Date of Patent: Dec. 8, 2015

(54) METHODS AND APPARATUS TO DISPLAY LOCALIZED PROCESS CONTROL OBJECTS

(75) Inventors: Mark Nixon, Round Rock, TX (US); Lee Allen Neitzel, Austin, TX (US); Ling Zhou, Austin, TX (US)

(73) Assignee: Fisher-Rosemount Systems, Inc., Round Rock, TX (US)

( * ) Notice: Subject to any disclaimer, the term of this patent is extended or adjusted under 35 U.S.C. 154(b) by 539 days.

(21) Appl. No.: 12/872,941

(22) Filed: Aug. 31, 2010

(65) Prior Publication Data

US 2012/0054599 A1    Mar. 1, 2012

(51) Int. Cl.
| | |
|---|---|
| *G06F 17/00* | (2006.01) |
| *G05B 19/418* | (2006.01) |
| *G06F 17/21* | (2006.01) |
| *G06F 17/22* | (2006.01) |

(52) U.S. Cl.
CPC .......... *G05B 19/4183* (2013.01); *G06F 17/218* (2013.01); *G06F 17/2247* (2013.01); *G05B 2219/32142* (2013.01)

(58) Field of Classification Search
CPC .................. G05B 2219/32142; G05B 19/4183; G06F 17/218; G06F 17/2247; G06F 17/248; G06F 17/30896
USPC ......... 715/255, 200, 205, 210, 234, 236, 238, 715/264, 265
See application file for complete search history.

(56) References Cited

U.S. PATENT DOCUMENTS

| | | | |
|---|---|---|---|
| 5,339,392 A | 8/1994 | Risberg et al. | |
| 5,572,668 A | 11/1996 | See et al. | |
| 5,664,206 A | 9/1997 | Murow et al. | |
| 5,754,858 A | 5/1998 | Broman et al. | |
| 6,195,681 B1 * | 2/2001 | Appleman et al. | ............ 709/203 |
| 6,282,548 B1 | 8/2001 | Burner et al. | |
| 6,308,168 B1 | 10/2001 | Dovich et al. | |

(Continued)

FOREIGN PATENT DOCUMENTS

| | | |
|---|---|---|
| GB | 2479037 | 9/2011 |
| JP | 2005174129 | 6/2005 |

(Continued)

OTHER PUBLICATIONS

"Best Practices for Globalization and Localization in WPF," Windows Presentation Foundation User Education, Jul. 6, 2006, [retrieved from the Internet on Apr. 19, 2010]. Retrieved from the Internet: http://blogs.msdn.com/wpfsdk/archive/2006/07/06/best-practices-for globalization-and-localization, 3 pages.

(Continued)

*Primary Examiner* — Thu Huynh
(74) *Attorney, Agent, or Firm* — Hanley, Flight & Zimmerman, LLC

(57) ABSTRACT

Example methods and apparatus to display localized process control objects. A disclosed example method includes receiving a request to view a process control object associated with a process control system, selecting a device description file based on the process control object, the device description file including a tag, selecting a set of locale templates based on a locale associated with the request, selecting a locale template from the set of locale templates based on the process control object, and processing the process control object for display by inserting portions of the selected locale template into the tag in the device description file.

25 Claims, 13 Drawing Sheets

(56) References Cited

U.S. PATENT DOCUMENTS

| | | | |
|---|---|---|---|
| 6,370,569 | B1 | 4/2002 | Austin |
| 6,487,566 | B1 * | 11/2002 | Sundaresan ................... 715/235 |
| 6,490,547 | B1 | 12/2002 | Atkin et al. |
| 6,763,395 | B1 | 7/2004 | Austin |
| 6,859,820 | B1 | 2/2005 | Hauduc et al. |
| 6,865,716 | B1 | 3/2005 | Thurston |
| 6,920,607 | B1 | 7/2005 | Ali et al. |
| 6,993,568 | B1 | 1/2006 | Hauduc et al. |
| 7,007,026 | B2 | 2/2006 | Wilkinson et al. |
| 7,013,284 | B2 | 3/2006 | Guyan et al. |
| 7,302,485 | B2 | 11/2007 | Bauer et al. |
| 7,318,087 | B2 | 1/2008 | Hauduc et al. |
| 7,552,452 | B2 | 6/2009 | McHugh et al. |
| 7,571,092 | B1 | 8/2009 | Nieh |
| 7,788,591 | B2 * | 8/2010 | Brunner et al. .............. 715/762 |
| 7,823,062 | B2 * | 10/2010 | Liberty et al. ................ 715/234 |
| 8,862,976 | B1 * | 10/2014 | Fishkin ......................... 715/204 |
| 2002/0080200 | A1 * | 6/2002 | Wong et al. ................... 345/969 |
| 2002/0101446 | A1 * | 8/2002 | Tang et al. .................... 345/751 |
| 2002/0156688 | A1 * | 10/2002 | Horn et al. ...................... 705/26 |
| 2003/0009572 | A1 | 1/2003 | Thurner |
| 2003/0140316 | A1 * | 7/2003 | Lakritz ......................... 715/536 |
| 2003/0179225 | A1 * | 9/2003 | Nettles et al. ................. 345/703 |
| 2004/0017403 | A1 * | 1/2004 | Andersson et al. ........... 345/848 |
| 2004/0122659 | A1 * | 6/2004 | Hourihane et al. ............... 704/9 |
| 2004/0177357 | A1 | 9/2004 | Heller et al. |
| 2004/0268306 | A1 * | 12/2004 | Cheng et al. .................. 717/114 |
| 2005/0240905 | A1 | 10/2005 | Poutnasseh et al. |
| 2006/0004738 | A1 * | 1/2006 | Blackwell et al. ................ 707/4 |
| 2006/0005127 | A1 * | 1/2006 | Ferguson et al. ............. 715/522 |
| 2006/0101329 | A1 | 5/2006 | Han et al. |
| 2006/0206804 | A1 * | 9/2006 | Barnett ......................... 715/513 |
| 2006/0288286 | A1 * | 12/2006 | Chandler et al. ............. 715/716 |
| 2007/0226608 | A1 * | 9/2007 | Virk et al. ..................... 715/513 |
| 2007/0250808 | A1 * | 10/2007 | Zeanah et al. ................ 717/100 |
| 2007/0283274 | A1 * | 12/2007 | Mettifogo ..................... 715/744 |
| 2008/0209335 | A1 * | 8/2008 | Walsh et al. .................. 715/744 |
| 2009/0064038 | A1 * | 3/2009 | Fleischman et al. .......... 715/810 |
| 2009/0083025 | A1 | 3/2009 | Hauduc et al. |
| 2009/0187837 | A1 * | 7/2009 | Fusaro et al. ................. 715/762 |
| 2009/0198647 | A1 * | 8/2009 | Tong ................................ 707/3 |
| 2009/0276206 | A1 | 11/2009 | Fitzpatrick et al. |
| 2010/0241417 | A1 * | 9/2010 | Bassett et al. ..................... 704/8 |
| 2011/0022947 | A1 * | 1/2011 | Rajkumar et al. ............ 715/235 |
| 2011/0035655 | A1 * | 2/2011 | Heineken ...................... 715/223 |

FOREIGN PATENT DOCUMENTS

| | | |
|---|---|---|
| JP | 2007052738 | 3/2007 |
| WO | 2004086160 | 10/2004 |

OTHER PUBLICATIONS

"Localization Attributes and Comments," .NET Framework 4—Windows Presentation Foundation, 2010, [retrieved from the Internet on Apr. 19, 2010]. Retrieved from the Internet: http//:msdn.microsoft.com/en-us/library/ms753944(printer).aspx, 3 pages.

brunzefb, "Localizing WPF Applications using Locbaml," The Code Project, Jan. 25, 2007, [retrieved from the Internet on Apr. 19, 2010]. Retrieved from the Internet: http://www.codeproject.com/KB/WPFUsingLocbaml.aspx?display=Print, 20 pages.

Jayant Kulkarni, "Understanding satellite assemblies and using them in your application," Feb. 9, 2006, [retrieved from the Internet on Mar. 2, 2010]. Retrieved from the Internet: http://www.codeguru.com/csharp/.net/net_general/tipstricks/print.php/c11367, 3 pages.

"Satellite assemblies," .Net assembly—Wikipedia, the free encyclopedia, [retrieved from the Internet on Mar. 2, 2010]. Retrieved from the Internet: http://en.wikipedia.org/wiki/.Net_assembly, 1 page.

Software Toolbox, "OPC Web Client," product details, retrieved Mar. 24, 2010, www.opcwebclient.com/html/product_details.html, Jun. 22, 2009, 1 page.

Software Toolbox, "Manually Controlling the Behavior of the OPC Web Client," manual, retrieved Mar. 24, 2010, www.opcwebclient.com/html/manual.html, Jun. 22, 2009, 1 page.

Software Toolbox, "How it Works," retrieved Mar. 24, 2010, www.opcwebclient.com/html/how_it_works.html, Jun. 22, 2009, 2 pages.

Intellectual Property Office, Search Report, issued for Great Britain patent application serial No. GB1113568.8, on Dec. 7, 2011, 3 pages.

The State Intellectual Property Office of the People's Republic of China, "The First Office Action," issued in connection with Application No. 201110261414.6, Mar. 24, 2014, 9 pages.

Japan Patent Office, "Notice of Reasons for Rejection," issued in connection with Japanese Patent Application No. 2011-186195, mailed Jun. 30, 2015 (8 pages).

* cited by examiner

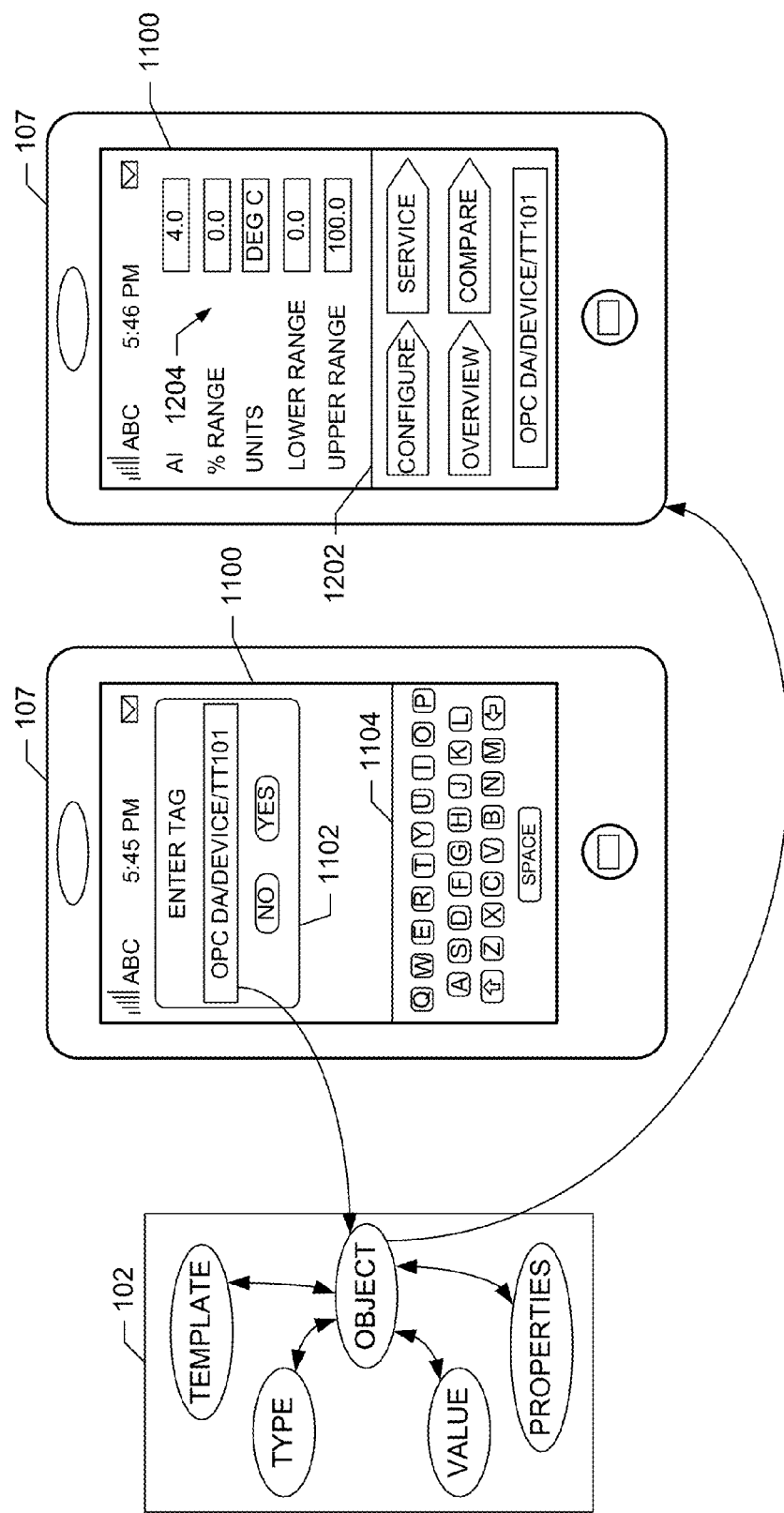

METHODS AND APPARATUS TO DISPLAY LOCALIZED PROCESS CONTROL OBJECTS

FIELD OF THE DISCLOSURE

The present disclosure relates generally to process control systems and, more particularly, to methods and apparatus to display localized process control objects.

BACKGROUND

Process control systems, like those used in chemical, petroleum or other processes, typically include one or more process controllers and input/output (I/O) devices communicatively coupled to at least one host or operator workstation and to one or more field devices via analog, digital or combined analog/digital buses. The field devices, which may be, for example, valves, valve positioners, switches and transmitters (e.g., temperature, pressure and flow rate sensors), perform process control functions within the process such as opening or closing valves and measuring process control parameters. The controllers receive signals indicative of process measurements made by the field devices, process this information to implement a control routine, and generate control signals that are sent over the buses or other communication lines to the field devices to control the operation of the process. In this manner, the controllers may execute and coordinate control strategies or routines using the field devices via the buses and/or other communication links communicatively coupling the field devices.

Information from the field devices and the controllers may be made available to one or more applications (i.e., routines, programs, etc.) executed by the operator workstation (e.g., a processor-based system) to enable an operator to perform desired functions with respect to the process, such as viewing the current state of the process (e.g., via a graphical user interface), evaluating the process, modifying an operation of the process (e.g., via a visual object diagram), etc. Many process control systems also include one or more application stations. Typically, these application stations are implemented using a personal computer, workstation, or the like that is communicatively coupled to the controllers, operator workstations, and other systems within the process control system via a local area network (LAN). Each application station may execute one or more strategies, routines, or applications that perform campaign management functions, maintenance management functions, virtual control functions, diagnostic functions, real-time monitoring functions, safety-related functions, configuration functions, etc. within the process control system.

Additionally, the application stations and/or the operator workstations may implement applications that are configured (e.g., localized) for a language of the operator. As part of a language build procedure for an application, a process control designer or an application designer typically adds translated phrases (e.g., English language phrases) and/or formats data fields based a numerical format associated with a locale. In other examples, a designer may configure an application with a resource file by updating localization information within the application.

Furthermore, controllers and databases that manage process control information are generally configured with regional settings (e.g., a language setting) for a process control system. In many instances, these controllers and/or databases are only able to use one regional setting. The controllers and the databases with resource files may need to be reconfigured to support other language settings. In other words, controllers and/or databases may only be able to handle requests from applications within a single process control system for one locale at a time and may require complete reconfiguration to be updated for different locales.

Controllers and/or databases are generally associated with a single locale, and an application accessing information generated by a controller may only display the information in a language associated with a locale assigned to the controller. Thus, if an application accesses multiple controllers distributed among multiple locales, multiple languages may be involved. Updating controllers to support language releases may be inefficient and/or time consuming because controllers may include relatively large amounts of control routines that reinitialize upon a language update or change. Further, updating controllers may include stopping a process control system.

SUMMARY

Example methods and apparatus to display localized process control objects are described. In one example, a method includes receiving a request to view a process control object associated with a process control system and selecting a device description file based on the process control object, the device description file including a tag. The example method also includes selecting a set of locale templates based on a locale associated with the request and selecting a locale template from the set of locale templates based on the process control object. The example method further includes processing the process control object for display by inserting portions of the selected locale template into the tag in the device description file.

An example apparatus includes a device description file processor to select a device description file based on a request to view a process control object, the device description file including a tag. The example apparatus also includes a template processor to select a set of locale templates based on a locale associated with the request and select a locale template from the set of locale templates based on the received process control object. The example apparatus further includes an object manager to process the process control object for display by combining the selected locale template with the tag in the device description file.

BRIEF DESCRIPTION OF THE DRAWINGS

FIGS. 11 and 12 show an example user interface displayed on a wireless device.

DETAILED DESCRIPTION

Figure 1:
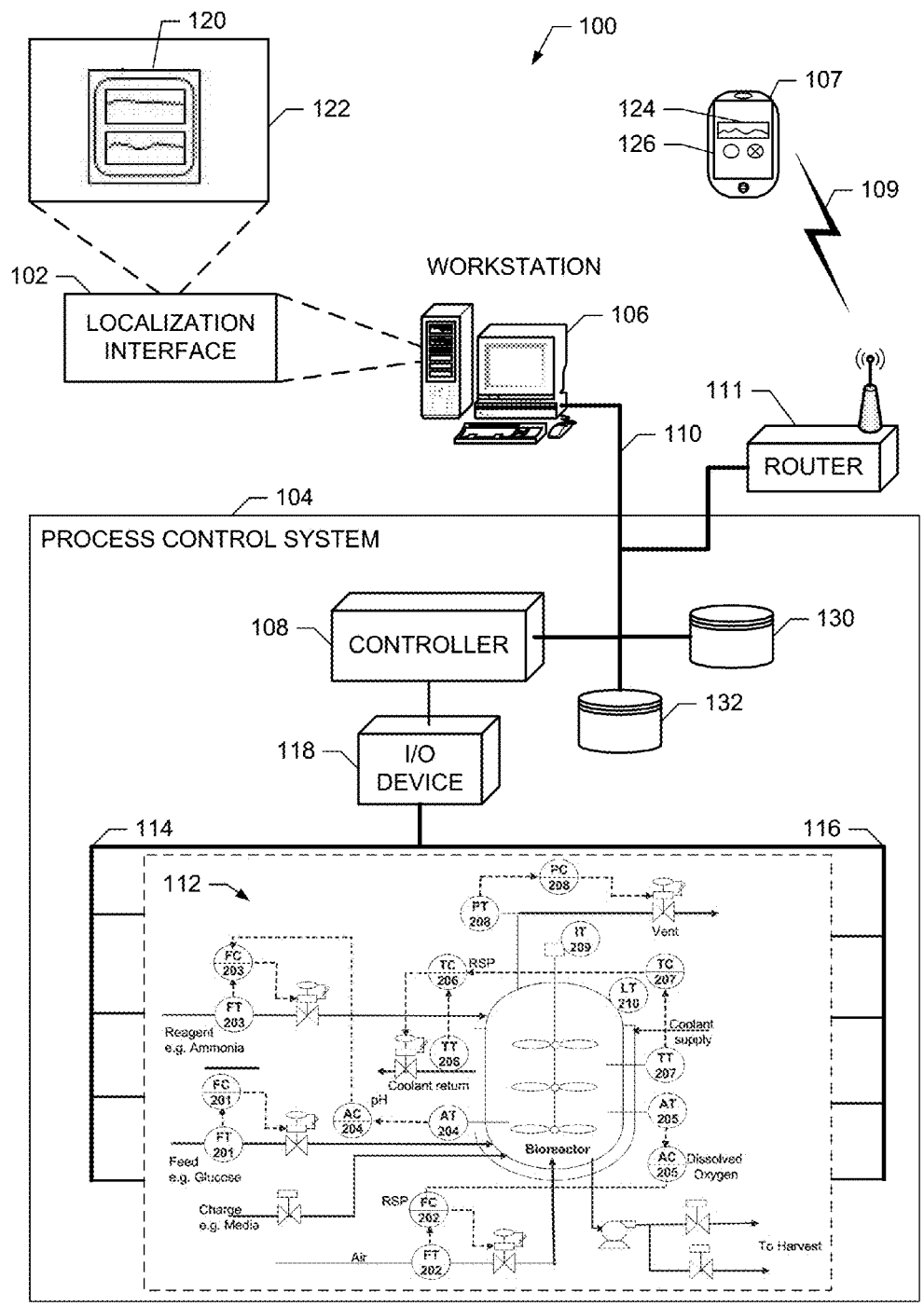
FIG. 1 shows a block diagram illustrating an example process control system including an example localization interface.

Although the following describes example methods and apparatus including, among other components, software and/or firmware executed on hardware, it should be noted that these examples are merely illustrative and should not be considered as limiting. For example, it is contemplated that any or all of the hardware, software, and firmware components could be embodied exclusively in hardware, exclusively in software, or in any combination of hardware and software. Accordingly, while the following describes example methods and apparatus, persons of ordinary skill in the art will readily appreciate that the examples provided are not the only way to implement such methods and apparatus. For example, while the example methods and apparatus are described in connection with displaying localized process control objects, the example methods and apparatus are more generally applicable and may be implemented to display localized process control objects associated with any automation system, batch processing system, manufacturing system, industrial control system, safety instrumented system, etc.

Process control systems generally include controllers to perform routines, control strategies, and/or algorithms that manage field devices located in the control system. The field devices may be, for example, valves, valve positioners, switches and transmitters, and may perform process control functions such as opening or closing valves and measuring process control parameters. In addition to managing field devices, controllers may generate process control information based on data received from the field devices. The process control information (e.g., resources) may include process statistics, alarms, monitoring information, process trend information, diagnostic information, field device status information, and/or messages from the field devices. Process control information, field devices, portions of a process control system, and/or components of field devices are collectively referred to as process control objects.

Controllers transmit process control information to applications operating on workstations so that operators may manage the process control system. Typically, applications display process control objects as at least one graphical data representation in a user interface. Data representations are helpful to operators by displaying process control objects graphically in the form of charts, graphs, data tables, list boxes, graphical symbols, text, etc. The data representations and corresponding text within the user interface are generally displayed in a format and/or language associated with a locale of an operator viewing the information. A locale of an operator may include a country, a language, a numeric format, a time zone, a geographic region, a cultural region, a dialect, an ethnic region, etc.

Process control systems may be used in facilities throughout the world. For each country and/or region, personnel prefer to work in a familiar language (e.g., French, German, Japanese, Polish, etc.) and/or regional setting. Generally, for any process control system there may be a variety of personnel with different levels of training and/or experience, which may be affected by a language used by the process control system. Additionally, a language preferred by these different personnel may not always be the same, even within the same facility. For example, an engineer may prefer to analyze a process in English, while an operator may prefer to monitor a process in Chinese.

Further, process control systems may be configured and/or diagnosed from remote locations. For example, a process control system in Japan may include applications and control routines designed in the United States. In this example, United States personnel responsible for configuring or diagnosing issues within the system may be proficient in English while process control personnel in Japan may be proficient in Japanese. As a result of the language differences, the Japanese control system may be restricted from using diagnostic and configuration support in the United States. Additionally, sharing configuration information between the two languages may be difficult and inefficient. In many instances, the system may not be reconfigured to another language due to the time required to configure a process control system once a system is configured. Thus, any innovations developed on a new system may not be easily incorporated into the configuration of the original system.

Process control systems in different parts of the world may share common resources and/or system configuration information. However, these process control systems may be configured with different regional settings (e.g., localized). Sharing information between control systems with different regional settings may be relatively difficult and time consuming. In some examples, information transmitted to a control system with a different regional setting may be converted prior to utilizing the information within the system. Further, converting information between different regional settings may result in issues from improperly converted information. For example, a value of 75.000 in a United States regional setting may be 75 (where the period is the decimal number separator and the comma is the thousands separator). In France, the same value may be represented as 75,000 (where the comma is the decimal number separator and the period is the thousands separator). The number 75.000 may not be converted to the corresponding proper value of 75,000. Without this conversion, the receiving control system may utilize a value that is 1000 times greater than expected.

To account for conversion issues, the text in many process control systems may be configured to be language neutral. In other words, many known process control systems may use pointers (e.g., variable names) instead of natural language words. In some examples, pointers may be more difficult to maintain than words. Further, only a portion of a process control system may be configured to be language neutral due to configuration complexity. However, other portions of the process control system may be designed for a single language. Thus, these language neutral portions of a process control system may need to be translated for different languages.

In addition to process control systems generally, field devices within process control systems may be localized for a region and/or language. In some known systems, a process control application displays process control information from field devices via corresponding device description files (e.g., electronic device description language (EDDL) files). Device description files are files that may be stored within a field device or, alternatively, stored within a controller and/or a workstation. The files provide instructions relating to how an application is to display information generated by the field devices. In this manner, the device description files enable applications to display graphical representations of process control objects including process control information generated from corresponding field devices. For example, an application may use a device description file to determine a field device outputs process control information in millivolts (e.g., a type of unit and a magnitude of the unit). The device description file may also define a graphical representation for the millivolt output to be, for example, a gauge, a chart, a numerical value field, a micro-chart, a bar-graph, a grid, and/or an image.

Device description files also describe functionality of field devices. This functionality may include menu system descriptions, general device information, diagnostics, performance analysis information, operational statistics, parameterization information, range setup information, simulation parameters, override information, calibration trim information, monitoring information, device security protocols, and/ or reset information. In some examples, the device description files are text-based files readable via a word processing application.

To localize a field device, text and/or numeric fields within the device description file are modified to reflect a desired locale. Additionally, applications that display process control objects via user interfaces have to be updated to reflect the localized device description file. In this manner, process control objects are formatted for a locale and displayed within an application configured for the same locale. If any portions of the device description file are modified, corresponding applications that display process control objects have to be appropriately updated by process control personnel. Updating these applications can be time consuming and relatively inefficient.

The information and/or data that is localized for an application and/or a device description file is referred to as localized information. The localized information may include translated text strings that may describe a condition, instruction, command, an event, a status, a value, and/or any other text displayed within an application. Additionally, localized information may include numeric formatting information.

Currently, many field device manufacturers include device description files, test scripts, and/or device specific components within a toolkit provided with the field device to distributors. The distributors then localize the device description file and associated applications based on their locale. Additionally, the distributors may validate the localized device description file with associated applications to ensure the localization did not alter the functionality of the field device and/or the device description file. Upon validating the translated file, the distributors convey the field device, the translated device description file, and/or the corresponding application to process control system managers for use within process control systems.

In many instances, a controller and/or a database that uses device description files may need to be re-initialized every time a language or locale is changed so that controller instructions may be updated. Additionally, controllers and/or databases may need to be re-initialized as localizable phrases and translated text files (e.g., localized information) within the device description files are modified and/or expanded. Re-initialization of a controller may require stopping a process control system, which may cause lost revenue from stoppages in production. Further, a controller configured for one locale may not be capable of supporting multiple applications that may require displaying process control objects in multiple languages (e.g., for operators and associated applications located in different parts of the world).

The example methods and apparatus described herein display process control objects in applications by utilizing tags within device description files that enable localized information to be managed in separate databases. In other words, the example methods and apparatus described herein separate process control objects and device description files from localizable information, thereby enabling process control objects to be displayed in localized contexts without modifying device description files and/or process control information. In this manner, the example methods and apparatus described herein are implemented as an interface layer between a device layer that generates process control information and a host application layer that displays the process control information within applications.

The tags within device description files replace localized text, formats, and/or values (e.g., localized information). The tags reference localized information within locale templates. A database may include locale templates for different locales (e.g., Japan, United States, Germany, etc.). A locale template may be a locale-specific resource file that includes text strings, numeric field definitions, and/or data graphical representation definitions. The locale-specific resource file may also include references to process control information generated by corresponding field devices that may be used to appropriately display process control information. Alternatively, a locale template may include an Extensible Stylesheet Language Transformation (XSLT) file and/or an Extensible Markup Language (XML) file that includes localized information. The XSLT and/or the XML file may be converted by the example methods and apparatus described herein into a HyperText Markup Language (HTML) file to display process control objects within a web browser. In some examples, the locale template may include an XML file that includes tags that reference corresponding tags in an XML device description file.

To utilize a device description file for a specific locale, the example methods and apparatus described herein enable process control personnel to select a locale. The example methods and apparatus described herein then use the specified locale and a requested process control object to display the process control objects via applications in the selected localized format. Because the localized information is separate from device description files, a single device description file can be used concurrently for multiple locales. For example, an operator may view on a workstation process control objects in Japanese while an engineer on a different workstation within the same area views the same process control objects in English. Additionally, the example methods and apparatus described herein enable an operator to switch a locale and/or language of an application relatively quickly without having to re-initialize a controller and/or device description file in a database.

Further, because the device description files and localized information are separate, field device manufacturers can release device description files for a field device and specify tags associated with localized information. Distributors and/ or process control personnel then create locale template(s) with localized information instead of modifying (and potentially corrupting) the device description file. Further, the distributors and/or the process control personnel may only have to validate the locale template instead of a translated device description file.

By separating device description files from locale temples, updates and/or modifications to locale templates may be made without stopping a controller and/or a field device.

Thus, language updates may be applied without affecting productivity, efficiency, and/or revenue generated from the operation of a control system. Additionally, because the locale templates include text strings and/or numeric fields, the locale templates may be relatively easily modified by any text editing application. While the example methods and apparatus are described and shown throughout this disclose implementing locale templates associated with Latin-based languages, the locale templates may also include other languages and/or dialects (e.g., Indian, Japanese, Chinese, Arabic, etc.).

The example methods and apparatus described herein also reduce design time for graphical representations of process control objects within applications. For example, locale templates may specify how process control objects are displayed within an application for a specific locale. In this manner, applications are not hardcoded with localized information for a locale. Instead, the methods and apparatus described herein transmit a rendered locale template to an application for display.

The example methods and apparatus described herein also display process control objects based on a type of display. For example, many process control personnel view process control objects on a workstation, laptop, and/or other computing device. Additionally, with advances in mobile devices, process control personnel may also view process control objects on a smartphone, a netpad, a field communicator, a personal digital assistant, and/or any other wireless mobile device. However, because screen sizes may vary between the different devices, many known process control systems have different applications for different device types. Further, some of the applications for mobile devices may not include some of the functionality of applications for workstations. For example, to access some process control information via a smartphone, a user may have to use a process control mobile application.

The example methods and apparatus described herein utilize different locale templates based on a type of a device that transmitted a request for process control objects. In this manner, process control designers may specify localized layout information within locale templates for different screen sizes while maintaining common functionality among the templates. The example methods and apparatus select an appropriate locale template based on a device of a user to display process control objects formatted for a locale of the user and formatted based on the device of the user. In this manner, the example methods and apparatus described herein enable process control objects to be accessed via web browsers regardless of device type.

FIG. 1 shows a block diagram of an example process control environment 100 including an example localization interface 102. The example localization interface 102 is part of a process control system 104. Additionally, the localization interface 102 may be implemented by and/or included within a workstation 106 and/or a wireless device 107. In other examples, the localization interface 102 may be included within a server, a processor, a distributed computing network, and/or any other computing device(s) that may be communicatively coupled to the workstation 106 and/or the wireless device.

The example workstation 106 of FIG. 1 may include any computing device such as a personal computer, a laptop, a server, a controller, a personal digital assistant (PDA), a micro computer, etc. The example wireless device 107 may include any mobile computing device such as, for example, a cell phone, a smartphone, a PDA, a netpad, a field communicator, a laptop, etc. The workstation 106 and/or the wireless device 107 may be implemented using any suitable computer system or processing system (e.g., the processor system P10 of FIG. 15). For example, the workstation 106 and/or the wireless device 107 could be implemented using a single processor personal computer, single or multi-processor workstations, etc.

The example process control system 104 may include any type of manufacturing facility, process facility, automation facility, safety instrumented facility, and/or any other type of process control structure or system. In some examples, the process control system 104 may include multiple facilities located at different locations. Additionally, the example process control environment 100 may include other process control systems (not shown) that may be included within the same facility and/or located at a different facility.

The example process control system 104 includes a controller 108 that may be communicatively coupled to the wireless device 107 via a wireless network 109 and communicatively coupled to the workstation 106 via a local area network (LAN) 110. The LAN 110 and/or the wireless network 109 may be implemented using any communication medium and/or protocol. For example, the LAN 110 may be based on a hardwired or wireless Ethernet communication scheme. However, any other suitable communication medium and protocol could be used. Furthermore, although the wireless network 109 and the LAN 110 are shown, more than one LAN and/or wireless network and appropriate communication hardware may be used to provide redundant communication paths.

Additionally, the process control environment 100 of FIG. 1 includes a router 111 to communicatively couple the wireless device 107 to the LAN 110 via the wireless network 109. The router 111 may also communicatively couple other workstations (not shown) to the controller 108 and/or to communicatively couple the workstation 106 to controllers (not shown) within other process control systems. Further, the process control environment 100 may include a firewall (not shown) to provide remote workstations (e.g., workstations outside of the process control environment 100) access to resources within the process control environment 100.

The process control system 104 also includes field devices 112 (e.g., input and/or output devices). The field devices 112 may include any type(s) of process control component(s) capable of receiving inputs, generating outputs, and/or controlling a process. The field devices 112 may include control devices such as, for example, valves, pumps, fans, heaters, coolers, and/or mixers to control a process. Additionally, the field devices 112 may include measurement or monitoring devices such as, for example, temperature sensors, pressure gauges, concentration gauges, fluid level meters, flow meters, and/or vapor sensors to measure portions of a process. The field devices 112 receive instructions from the controller 108 via inputs 114 to execute a specified command and cause a change to the process implemented and/or controlled by the field devices 112. Furthermore, the field devices 112 measure process data, environmental data, and/or input device data and transmit the measured data via outputs 116 to the controller 108 as process control information. This process control information may include the values of variables corresponding to a measured output from each field device.

The process control system 104 also includes an I/O device 118 (e.g., one or more I/O cards) to receive data from the field devices 112 and convert the data into communications capable of being processed by the example controller 108. Likewise, the I/O device 118 may convert data or communications from the controller 108 into a data format capable of being processed by the corresponding field devices 112.

The example controller 108 of FIG. 1 operates one or more control routines (e.g., process control algorithms, functions, and/or instructions) to manage the field devices 112 within the process control system 104. The control routines may include process monitoring applications, alarm management applications, process trending and/or history applications, diagnostic applications, batch processing and/or campaign management applications, statistical applications, streaming video applications, advanced control applications, safety instrumented applications, etc. The example controller 108 transmits process control information (e.g., resources) to the workstation 106 and/or the wireless device 107. The resources transmitted by the controller 108 may include process control values, data values, alarm information, text, status information, diagnostic information, error messages, parameters, events, and/or device identifiers. In other examples, the controller 108 may forward process control information from the field devices 112 to a database (not shown).

The example workstation 106, the example wireless device 107, and/or other workstations with access to the process control system 104 may be configured to view, modify, and/or correct one or more processes within the process control system 104 via one or more applications. In the illustrated example, an application 120 is displayed via a user interface 122. Applications may include an enterprise view application, a graphics studio application, an explorer application, and/or any other type of process control-based application. These applications display information within the workstation 106 via the user interface 122. The user interface 122 may include a graphical window (e.g., an application programming interface (API)) that may be displayed within the workstation 106 to show one or more resources displayed as graphical representation(s) (e.g., functional block diagrams and/or schematics). The workstation 106 may be capable of displaying more than one user interface 122 that may be communicatively coupled to the localization interface 102. In a similar manner, the wireless device 107 includes an application 124 displayed via a user interface 126.

The example process control system 104 of FIG. 1 also includes a device description database 130 and a template database 132. The databases 130 and 132 may be implemented by Electronically Erasable Programmable Read-Only Memory (EEPROM), Random Access Memory (RAM), Read-Only Memory (ROM), and/or any other type of memory. The example device description database 130 stores device description files associated with the field devices 112. The device description files may include text-based files that describe functions, features, and/or components of the field devices 112. In some examples, the device description files may be EDDL-based files.

The device description files are stored to the database 130 by process control personnel when a corresponding field device is added to the field devices 112 within the process control system 104. In some examples, the device description file may be included within a field device and stored to the database 130 via the controller 108 upon adding the field device to the field devices 112. While the device description database 130 is shown as being separate from the controller 108, in some process control environments the database 130 may be included within the controller 108, the workstation 106, and/or the wireless device 107. In these examples, the controller 108 may locally access device description files to operate a control routine and/or algorithm. Alternatively, the workstation 106 and/or the wireless device 107 may locally access device description files to display corresponding process control information.

In the example of FIG. 1, the device description files include tags (e.g., cross-reference identifiers) to localized information within locale templates stored within the template database 132. The locale templates may be stored within sets associated with a particular locale. Each of the sets may include locale templates for different process control objects, device display types, and/or process control information types. For example, the template database 132 may include a set of locale templates associated with a German locale, a set of locale templates associated with a French locale, and a set of locale templates associated with a Mexican locale. Each of the sets may include locale templates for displaying process control objects on the wireless device 107 and locale templates for displaying process control objects on the workstation 106. Further, each of the sets may include locale templates associated with different types of process control objects and/or corresponding process control information generated by the controller 108.

The locale templates may be stored to the template database 132 by process control personnel who may create the locale templates based on specified tags within device description files. In other examples, distributors and/or regional process control managers may generate the locale templates. By storing locale templates that include localization information, process control personnel may build translation files into the process control system 104 separate from relatively core components defined within the controller 108 and/or device description files within the database 130. Further, by separating localization information from core process control functionality, translation information may be modified and/or updated without having to take the process control system 104 offline.

In some examples, the locale templates may be text-based resource files that include tags that correspond to tags within device description files. In other examples, the locale templates may include XML and/or XSLT files for displaying process control objects in web browsers. The tags within the locale templates may reference translated text, numeric formats, and/or any other localized information. The locale templates may also include graphical formatting information to display the localized information within an application.

The example template database 132 of FIG. 1 may also include default information. For example, the template database 132 may include a locale neutral set of locale templates. In examples where a locale cannot be matched, the localization interface 102 may use a default locale template. In other examples, the localization interface 102 may select a default locale template and use a translator to convert default text into a locale specified by a user to display within an application.

To display localized process control objects within the application 120, the user interface 122 may transmit a request from a user to view one or more process control objects. The user interface 122 transmits the request to the localization interface 102. The localization interface 102 then determines a locale associated with the request. The locale may be identified by locale information included within the request including, for example, a language type, a numeric format, an Internet Protocol address, a data format, a country, a region, and/or a dialect. In other examples, the request may include metadata that identifies a locale. In yet other examples, a user may select a locale upon logging into the workstation 106.

Upon determining a locale, the example localization interface 102 determines a process control object type requested by the user. The process control object type may be determined based on an identifier of the process control object and/or a name extension of the process control object. For example, a field device process control object may include an identifier of 'FD' and/or a name extension of '.device,' while a functional block process control object may include an identifier of 'FB' and/or a name extension of 'block.' The example localization interface 102 accesses the device description database 130 to search for device description file(s) associated with the requested object. The localization interface 102 may then access the template database 132 to select a set of locale templates associated with the locale of the user. Within the set, the localization interface 102 selects one or more locale templates that include tags that correspond to tags within the device description file(s). The localization interface 102 may also select locale templates based on the process control object type and/or any process control information generated by the controller 108 associated with the selected process control object.

The example localization interface 102 displays the selected process control object via the user interface 122 by rendering the selected locale templates in combination with and/or inserted within the device description file(s) to generate the display. Combining and/or inserting locale templates with a device description file(s) includes identifying tags within the device description file(s), identifying corresponding tags within locale templates, and processing and/or compiling the device description file(s) with the tagged portions of the locale templates that reference localized information. Rendering may also include identifying references to process control information within the device description file(s) and/or the locale templates and accessing the corresponding information within the controller 108. In this manner, the localization interface 102 displays newly generated process control information within the application 120 in a locale context of the user.

The example localization interface 102 of FIG. 1 enables a user of the workstation 106 to view process control objects via the user interface 122 in a format associated with a first locale while a second user of the wireless device 107 concurrently views the same process control objects via the user interface 126 in a format associated with a second locale. For example, the first locale could be associated with the Polish language while the second locale is associated with the Italian language. In this manner, the localization interface 102 within the workstation 106 and the localization interface 102 (not shown) within the wireless device 107 display language neutral process control information generated by the controller 108 and display localized process control objects for each of the respective users in the appropriate locale context.

Figure 2:
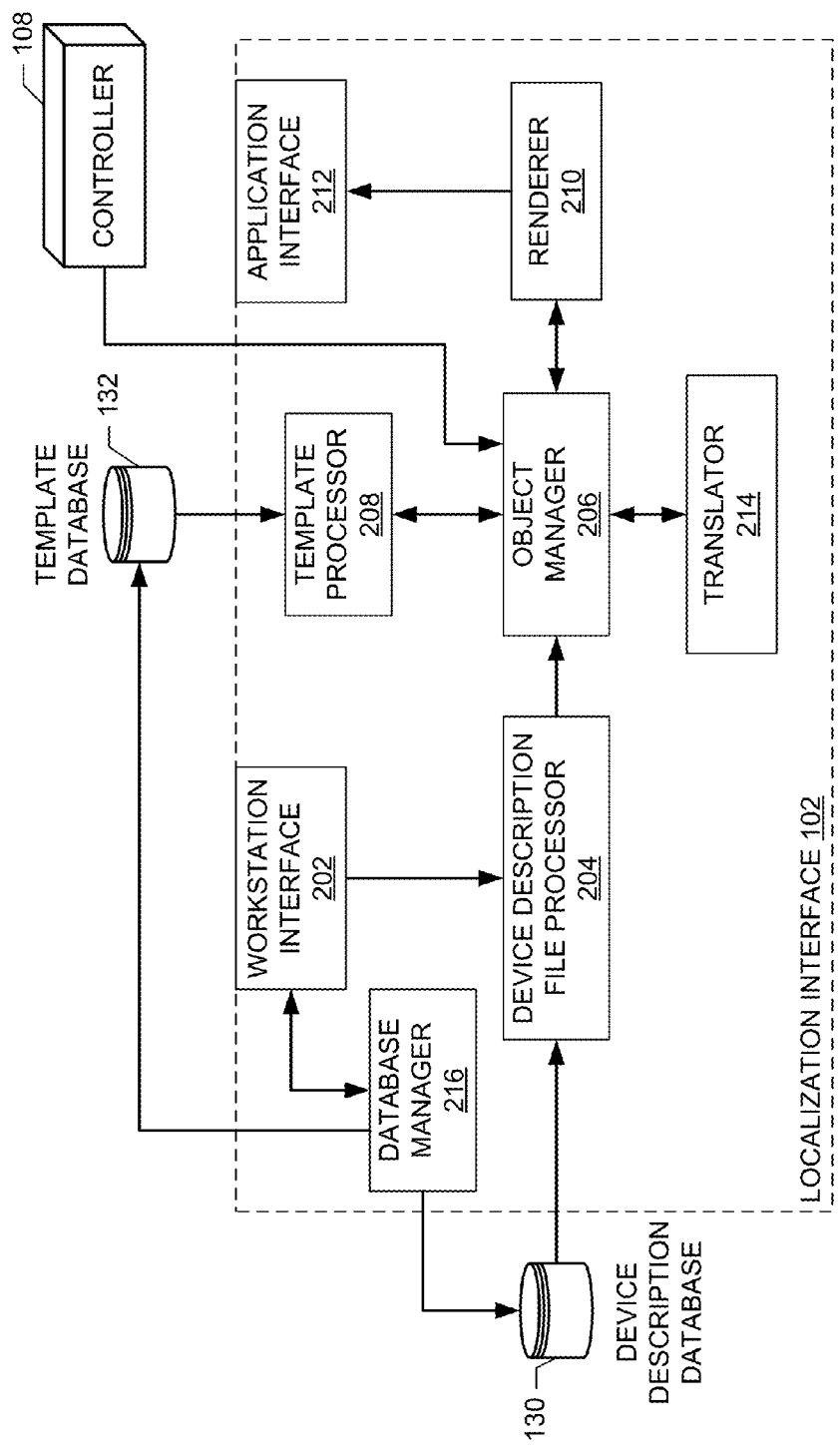
FIG. 2 shows a functional block diagram of the example localization interface of FIG. 1.

FIG. 2 shows a functional block diagram of the example localization interface 102 of FIG. 1. While the device description database 130 and the template database 132 are shown external to the localization interface 102, in some examples, the databases 130 and/or 132 may be included within the localization interface 102. The example localization interface 102 may concurrently process multiple requests to view process control objects from workstations (e.g., the workstation 106 and/or the wireless device 107). Alternatively, the example localization interface 102 may process a single request to view process control objects. In these alternative examples, multiple localization interfaces 102 may be accessed to process multiple requests. While the example localization interface 102 is described in connection with the workstation 106, the localization interface 102 may operate with the wireless device 107 and/or other workstations that have access to the process control environment 100 of FIG. 1.

To receive a request to view one or more process control objects, the example localization interface 102 includes a workstation interface 202. The example workstation interface 202 receives the request from a user via the workstation 106 and/or the user interface 122. A user selects a process control object by entering an identifier associated with the object into a request and/or search field. In other examples, a user selects a process control object by browsing to the desired object within a data directory. For example, a user may utilize an open function and navigate a directory to the desired process control object. In yet other examples, a user may view information associated with a process control object by selecting a graphical representation and/or an identifier associated with the object. Alternatively, a user may enter a website address that includes and/or lists process control objects. A user may then select the desired process control object listed within the displayed webpage. In some examples, a user may select multiple process control objects. In these examples, the process control objects may be included within a single request or, alternatively, multiple requests.

In addition to identifying one or more process control objects to view, the requests may also include location information identifying a locale of a user. In some instances, a user may select a locale upon logging into the workstation 106 and/or an application. In other instances, the request may include location information metadata identifying a locale based on configured regional settings within the workstation 106. In yet other instances a user may select a desired locale while requesting a process control object. In further instances, the request may include an IP address of the workstation 106. In these instances, the workstation interface 202 may user a geographic-IP address database to determine a locale associated with the IP address.

Additionally, a request may include information identifying a device type from which the request was transmitted. The device type information may be included within metadata associated with the request. In other examples, the workstation interface 202 may determine a device type based on a Media Access Control (MAC) address associated with a device that transmitted a request. For example, the MAC address may indicate if a device is a workstation and/or a handheld device. Alternatively, the workstation interface 202 may query a device for device type information.

Upon receiving a request to view a process control object, the example workstation interface 202 forwards the request to a device description file processor 204. In some examples, the workstation interface 202 may utilize security protocols prior to forwarding the request. For example, the workstation interface 202 may prompt a user for identification and/or a password to determine if the user is authorized to view the requested process control object. In other examples, the request may include metadata identifying a user that the workstation interface 202 may use to authenticate the user.

To select one or more device description files based on the requested process control object(s), the example localization interface 102 of FIG. 2 includes the device description file processor 204. After receiving a request, the example device description file processor 204 determines a type for each of the process control objects. The type may be determined by an identifier used to identify the process control object, a file name of the process control object, and/or metadata included within the request.

The example device description file processor 204 then accesses the device description database 103 to search for device description file(s) that match the requested process control object(s). To match a process control object to a device description file, the device description file processor 204 may locate files that include a type and/or an identifier of the process control object. For example, the request for a process control object may include a 'Rosemount® field device pressure sensor' type and a 'PRS02' identifier. The device description file processor 204 searches for device description files that define functionality for a Rosemount® field device pressure sensor. The device description file processor 204 may also search device description files that include definitions specifically for the PRS02 device. In some instances, a title and/or a file name of the device description file may include the type and/or the identifier. In other instances, metadata associated with the device description file may include the type and/or the identifier. In yet other instances, the device description file processor 204 may have to search text within the file for a matching type and/or identifier.

After selecting at least one device description file, the example device description file processor 204 transmits the file to an object manager 206. Additionally, the device description file processor 204 forwards the request to the object manager 206. The example object manager 206 processes device description file(s) for display within an application. To process a device description file, the example object manager 206 reads the file to determine any menu, display, and/or format information. The information may be used to format a template and/or format the process control object for display. The menu information may also include menu functions and/or options that are available to be displayed with the requested process control object. The menu functions may include functions to perform and/or information to view associated with the process control object.

The example object manager 206 also reads device description file(s) for tags. The tags reference localized information within locale templates that the object manager 206 uses to add translated text and/or formatted numeric values to a template for display. To obtain the appropriate locale templates, the example object manager 206 sends a message to a template processor 208 to search for locale templates. The message may include the request message from the user identifying the requested process control object(s) and/or the device description file(s) received from the device description file processor 204.

The example template processor 208 receives the message from the object manager 206 and accesses the template database 132 to search for locale templates. The example template processor 208 searches the template database 132 based on an organization of locale templates. In some examples, the locale templates may be organized within sets and/or groups based on locale. In these examples, the template processor 208 identifies a set of locale templates that matches a locale included within the request. The example template processor 208 then searches within the selected set for one or more locale templates that match the requested process control object, device type, and/or device description file(s). To select a set of locale templates based on locale, the template processor 208 uses location information (e.g., locale information) identified by the workstation interface 202. For example, the workstation interface 202 may determine that a request is associated with a German locale. The template processor 208 may then search for a set of locale templates corresponding to German translated text, formatting associated with German standards, and/or any other localized information associated with the German locale.

In other examples, the locale templates may be organized by sets and/or groups within the template database 132 based on a requesting device type and/or a process control object type. In these examples, the template processor 208 selects a set that matches the device type included within the request and/or a set that matches the requested process control object.

Within the selected set, the template processor 208 may then select a locale template that matches a locale associated with the request.

The example template processor 208 selects a locale template by matching tags within one or more device description files to corresponding tags within locale templates. For example, a device description file may include a '@High Alarm Value@' tag. In this example, the template processor 208 searches for locale templates that include a corresponding '@High Alarm Value@' tag. The tags may be identified based on special and/or unique programming characters within a text file. Alternatively, the template processor 208 (and/or the object manager 206) may identify tags based on a predefined code and/or variable identifier.

In some examples, the template processor 208 may select locale templates based on an identifier associated with a process control object. For example, a locale template may be created for a 'PUMP01' process control object. The template processor 208 may search for locale templates that have 'PUMP01' within a file name, metadata, and/or included within the template as text. In other examples, the template processor 208 may use a type of the process control object to select corresponding locale templates. In these examples, a locale template may include an indicator (e.g., metadata and/or file comments) that specifies that the locale template is configured to display localized information for a certain type of process control object.

The example template processor 208 may also select a locale template based on a device type that is to display the requested process control object. The locale templates may include information identifying which templates may be used for different device types. In some examples, the locale templates may indicate a list of acceptable devices. Alternatively, the locale templates may be identified based a device type with a relatively large display area (e.g., a computer monitor) and device type with a relatively small display area (e.g., a wireless phone display). In these examples, the template processor 208 selects the locale template that best matches a device that is to display the process control object using device type information from the workstation interface 202.

In some examples, the template processor 208 may not locate a locale template based on a process control object, a locale, tags, and/or a device type. In these examples, the template processor 208 may select a default locale template. For example, the template processor 208 may find locale templates that match a process control object but may not find a locale template specifically for a Canadian locale. In this example, the template processor 208 may select a default (e.g., English) locale template that matches the process control object.

After selecting one or more locale templates, the example template processor 208 transmits the locale template(s) to the object manager 206. The example object manager 206 processes the requested process control object(s) for display by executing, compiling, and/or operating the device description file(s) received from the device description file processor 204 with the received locale template(s). The object manager 206 processes a device description file with a locale template by inserting translated text and/or formatted data fields (e.g., localized information) tagged within the locale template to corresponding tag(s) within the device description file. In other words, the object manager 206 references tagged portions of the locale template to compile and/or execute corresponding tagged portions of the device description file to generate a display of a process control object. In other examples, the device description file may include a function call to the locale template. In these other examples, the object manager 206 executes the instructions within the locale template referenced by the device description file to generate the display of a process control object.

Additionally, the object manager 206 may use references to process control information (e.g., resources) generated by the controller 108 to display a requested object. In some examples, portions of a locale template may include a link, a file directory, and/or an identifier that corresponds to process control information. For example, a locale template may include a pump speed data field that is formatted to the European numbering convention. The locale template also includes a link to a pump speed parameter and/or variable calculated by the controller 108. The example object manager 206 uses the link to request the pump speed value from the controller 108. The object manager 206 then formats the value received from the controller 108 within the data field for the European format. The object manager 206 may then insert the formatted data field and pump speed value into a corresponding device description file to generate a process control object display that includes the pump speed shown in the European numbering convention. In this manner, a user may request a process control object to view the most recent data output from the object. In other examples, the object manager 206 may use links, references, data locations and/or identifiers within a device description file to access corresponding process control information from the controller 108.

The example object manager 206 uses device description file(s) and/or associated locale templates to generate a display file (e.g., an HTML file). The display file specifies locations of process control information, graphical representations of requested process objects, and data fields. The display file also includes translated text for display and/or any other localized information that may be specified within a locale template. The object manager 206 transmits the display file to a renderer 210. The example renderer 210 processes (e.g., renders) the display file into a format that is viewable by a user via, for example, the user interface 122. The example renderer 210 generates a display also based on a display size specified by locale templates within the display file. For example, the renderer 210 may generate a display for a relatively small viewing area for process control object(s) to be displayed by the wireless device 107 and a display for a relatively large viewing area for the same process control object(s) to be displayed by the workstation 106.

The example renderer 210 transmits the rendered display to an application within, for example, the workstation 106 to display the requested object(s). In some examples, transmitting the display may include sending the display information across the Internet to a web browsing application. In these examples, the web browsing application may also include the renderer 210 to generate the display within the user interface 122. In other examples, such as the example of FIG. 1, the renderer 210 transmits the rendered process control object(s) to the user interface 122 within the workstation 106.

To communicatively couple the renderer 210 to applications, the example localization interface 102 includes an application interface 212. The application interface 212 may receive a message from the renderer 210 indicating a target application, user interface, and/or workstation. The target information may be based on address information received in the request message by the workstation interface 202 and propagated through the localization interface 102. The application interface 212 uses the target information to initiate a viewing session within a target application. To initiate a viewing session, the application interface 212 may transmit request to connect messages to the target application, user interface, and/or workstation. Upon establishing a connection, the application interface 212 forwards the rendered process control object(s) from the renderer 210.

To translate default locale templates and/or to translate text sting information, the example localization processor 102 of FIG. 2 includes a translator 214. The example object manager 206 may use the translator 214 in instances when a locale template cannot be identified for a specified locale. The translator 214 may receive the default template from the object manager 214, translate text strings based on a specified locale, and transmit the translated text strings to the object manager 206. In this manner, the translator 214 may be used when locale templates for a locale have not been created. The example translator 214 may also convert data fields to a format based on the specified locale. For example, the translator 214 may include a library that identifies which numeric and/or data formats are associated with which locales.

The example localization interface 102 of the illustrated example also includes a database manager 216. The example database manager 216 manages locale templates within the template database 132 and device description files within the device description database 130. The database manager 216 manages locale templates by organizing locale templates into sets based on locale, device type, process control object type, etc. The database manager 216 may also update and/or modify locale templates when new localization information is available. The database manager 216 manages device description files by storing files to the database 130. A user may update, add, and/or remove device description files via the database manager 216. Alternatively, the database manager 216 may receive updates to device description files from the process control devices 112 via the controller 108.

In some examples, the database manager 216 may function as an interface for a user to manage the databases 130 and 132. In these examples, a user may access the databases 130 and/or 132 via the database manager 216, which provides a navigation interface to view the stored information. The database manager 216 may also provide a user an ability to read and/or write to the locale templates and/or the device description files.

While the example localization interface 102 has been illustrated in FIG. 2, one or more of the servers, platforms, interfaces, data structures, elements, processes and/or devices illustrated in FIG. 2 may be combined, divided, re-arranged, omitted, eliminated and/or implemented in any way. Further, the example workstation interface 202, the example device description file processor 204, the example object manager 206, the example template processor 208, the example renderer 210, the example application interface 212, the example translator 214, the example database manager 216 and/or, more generally, the example localization interface 102 may be implemented by hardware, software, firmware and/or any combination of hardware, software and/or firmware. Thus, for example, any of the example workstation interface 202, the example device description file processor 204, the example object manager 206, the example template processor 208, the example renderer 210, the example application interface 212, the example translator 214, the example database manager 216 and/or, more generally, the example localization interface 102 could be implemented by one or more circuit(s), programmable processor(s), application specific integrated circuit(s) (ASIC(s)), programmable logic device(s) (PLD(s)) and/or field programmable logic device(s) (FPLD(s)), etc.

When any apparatus claim of this patent is read to cover a purely software and/or firmware implementation, at least one of the example workstation interface 202, the example device description file processor 204, the example object manager 206, the example template processor 208, the example renderer 210, the example application interface 212, the example translator 214, and/or the example database manager 216 are hereby expressly defined to include a computer readable medium such as a memory, DVD, CD, etc. storing the software and/or firmware. Further still, the example localization interface 102 may include one or more elements, processes and/or devices in addition to, or instead of, those illustrated in FIG. 2, and/or may include more than one of any or all of the illustrated elements, processes and devices.

Figure 3:
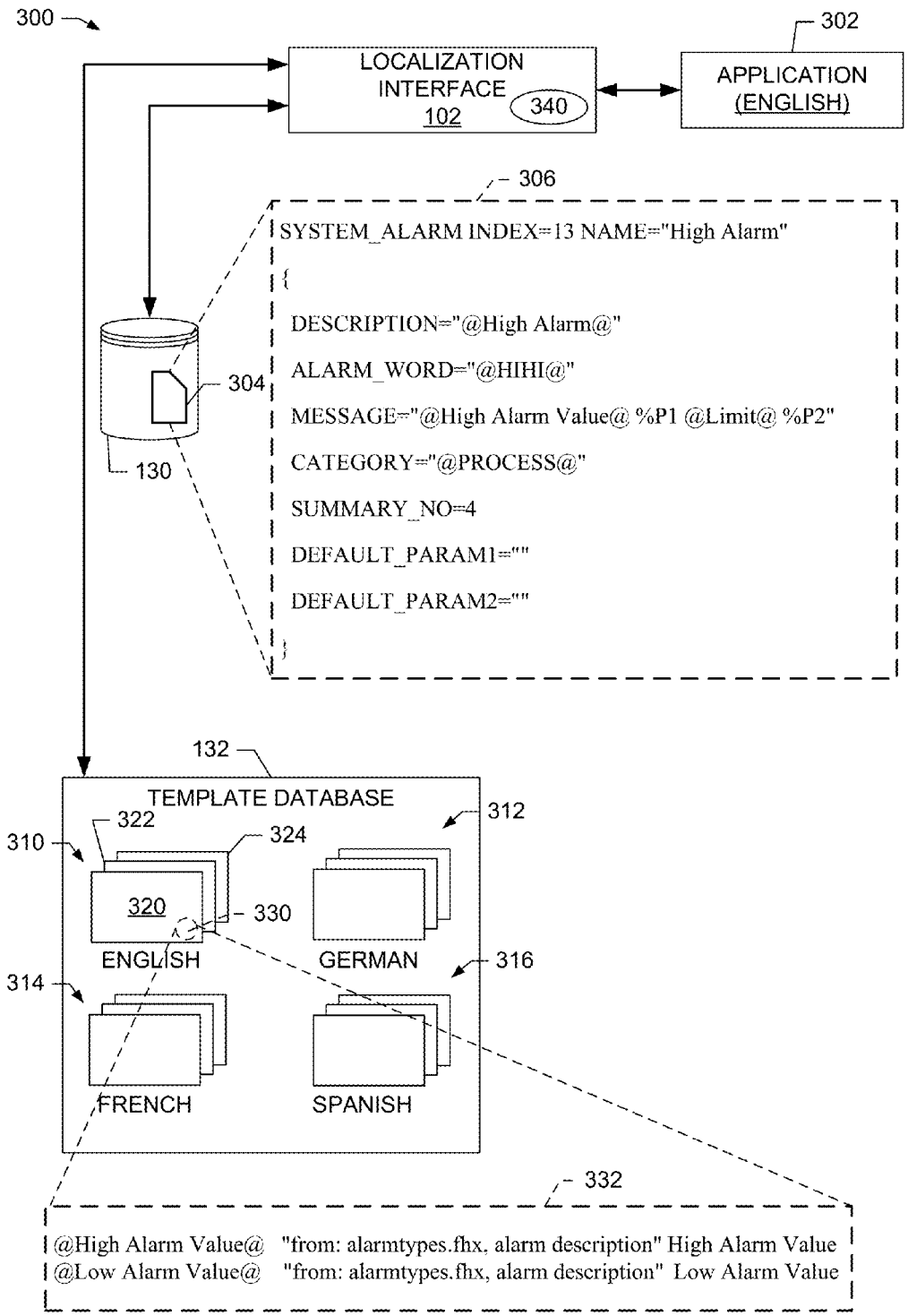
FIG. 3 shows an example implementation system including the localization interface of FIGS. 1 and 2 utilizing text-based resource locale templates.

FIG. 3 shows an example implementation system 300 including the localization interface 102 of FIGS. 1 and 2 utilizing text-based resource locale templates. In the illustrated example, the localization interface 102 displays process control objects in an application 302 based on text-based resource files. The application 302 may be displayed via the example user interface 122 of FIG. 1. In this example, the device description database 130 includes a device description file 304. A portion of the file 304 is displayed within a text box 306, which includes text in the EDDL format. In other examples, the device description file 130 may include other types of resource files.

The example also includes the template database 132 with four sets 310-316 of locale templates. In particular, the set 310 includes locale templates associated with an English locale, the set 312 includes locale templates associated with a German locale 312, the set 314 includes locale templates associated with a French locale, and the set 316 includes locale templates associated with a Spanish locale. In other examples, the template database 132 may include fewer or additional locale sets.

In this example, the English locale set 310 includes locale templates 320-324. The locale templates are shown as text-based resource files. A portion 330 of the locale template is highlighted within the text box 332. The locale templates 320-324 may each be associated with a different field device. Additionally or alternatively, the locale templates 320-324 may be associated with a device type for displaying process control objects. Further, each of the locale templates 320-324 may include different tags. While only the three locale templates 320-324 are shown, the set 310 may include fewer or additional locale templates.

In the example of FIG. 3, a portion of the device description file 130 is displayed within the text box 306. The example text box 306 includes parameters that define conditions to display a High Alarm warning system for a field device. Each of the parameters is referenced to a tag that corresponds to a tag within the locale templates 320-324. For example, the text box 306 includes a Description parameter that is associated with a '@High Alarm@' tag. In this example, the example localization interface 102 searches for locale templates with the '@High Alarm@' tag. The text box 306 also includes a Message parameter, which includes a '@High Alarm Value@' tag.

In the illustrated example, a user provides the localization interface 102 with a request 340 to view a process control object. The request 340 may include an identifier of the process control object. In response to the request 340, the localization interface 102 determines that the device description file 304 is associated with the requested 340 process control object. To display the process control object, the localization interface 102 determines that the request 340 is associated with the English locale, selects the English locale set 310, and determines that tags within the device description file 304 correspond to the locale templates 320-324.

To display, for example, the Message parameter within the text box 306, the localization interface 102 uses the '@High Alarm Value@' tag to identify the corresponding '@High Alarm Value@' tag within the text box 332. The localization interface 102 then incorporates (e.g., inserts) the localization information (e.g., "from: alarmtypes.fhx, alarm description" High Alarm Value) within the text box 332 into the '@High Alarm Value@' tag location adjacent to the Message parameter. The localization information includes a reference (e.g., alarmtypes.fhx) that the localization interface 102 uses to locate the process control information within the controller 108 and/or within other portions of the process control system 104. This process control information may include a value of the High Alarm. Additionally, the localization information includes translated text (e.g., High Alarm value) that is displayed by the localization interface 102 adjacent to the High Alarm Value. In this manner, the localization interface 102 uses the locale templates 320-324 to insert localized information into the device description file 130 to display the requested 340 process control object within the application 302.

In another example, while the localization interface 102 is displaying the requested 340 process control object in an English context, the localization interface 102 may receive a second request from another user to view the same process control object in the German locale. In this other example, the localization interface 102 accesses the German set 312 for locale templates and uses the same device description file 304 to display the tagged localization information in a German context. Thus, the example localization interface 102 enables the display of process control objects in different locale contexts concurrently using the same device description files.

Figure 4:
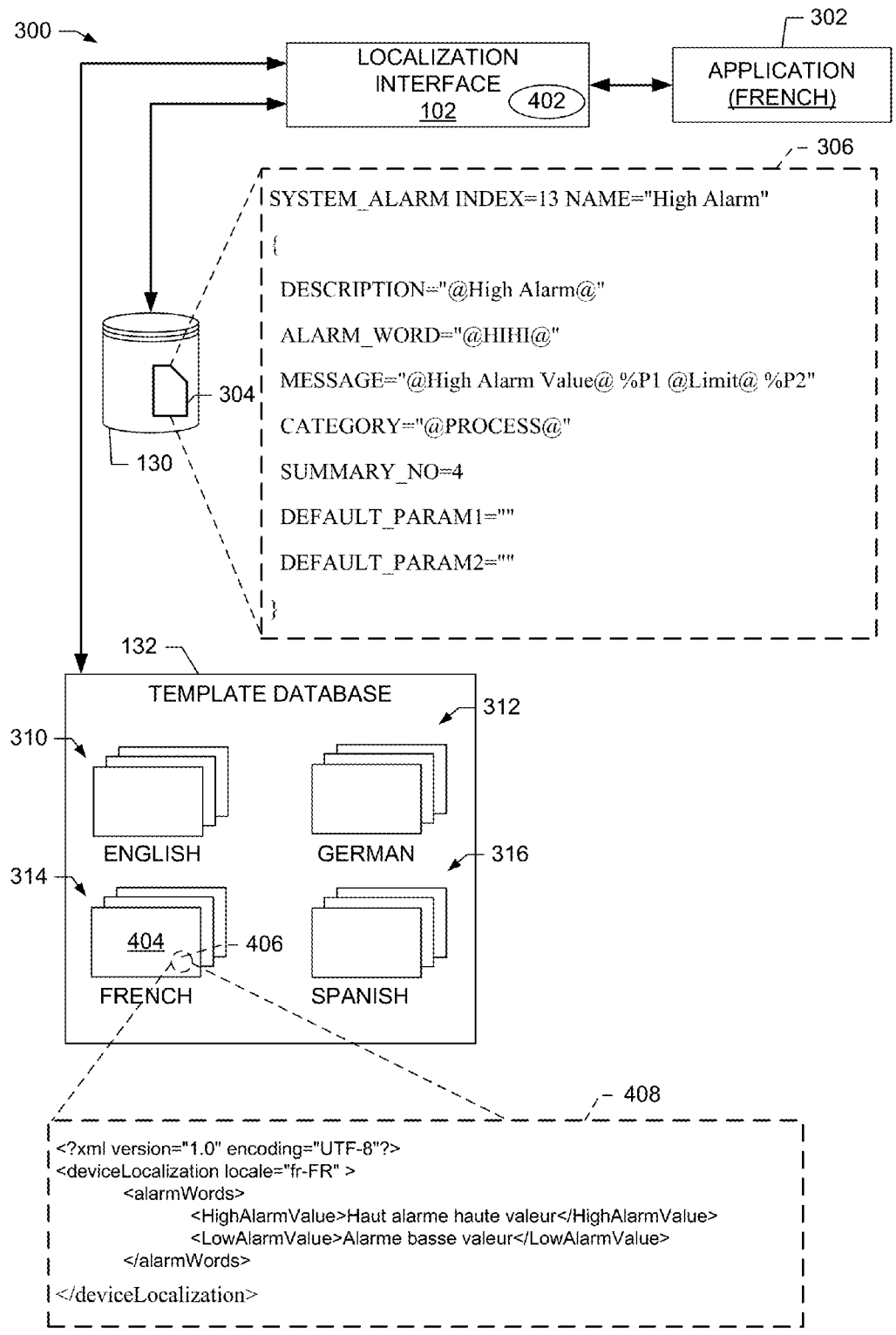
FIG. 4 shows the example implementation system of FIG. 3 including the localization interface of FIGS. 1 and 2 utilizing locale templates formatted for XML.

FIG. 4 shows the example implementation system 300 of FIG. 3 including the localization interface 102 of FIGS. 1 and 2 utilizing XML-formatted locale templates. In this example, the localization interface 102 receives a request 402 for a process control object that is associated with the device description file 304. The localization interface 102 determines that the request 402 is associated with a French locale and selects the French set 314 of locale templates including a locale template 404. In this example, the locale template 404 includes XML formatted text.

The example localization interface 102 matches the tags within the text box 306 to corresponding tags within the set 314. Specifically, the localization interface 102 matches the Message parameter to a portion 406 of the locale template 404. The portion 406 is shown within a text box 408. In this illustrated example, the localization interface 102 determines that the locale template 404 is formatted for an XML file based on a format line (e.g., <?xml version="1.0" encoding="UTF-8"?>). Additionally, the localization interface 102 determines that the locale template 404 is associated with the French locale 404 based on a localization line (e.g., <deviceLocalization locale="fr-FR">).

The example localization interface 102 uses the information that the locale template is an XML file to match the '@High Alarm Value@' tag associated with the Message parameter to the '<High Alarm Value>' XML formatted tag. The example localization interface 102 may then incorporate the text (e.g., Haut alarme haute valuer) associated with the '<High Alarm Value>' XML formatted tag into the Message parameter. The localization interface 102 may also access the controller 108 for process control information associated with the '% P1' variable. In this manner, the localization interface 102 displays the process control object specified by the request 402 within the application 302 including the 'Haut alarme haute valuer' High Alarm message in the French language and a value of the High Alarm corresponding to the '% P1' variable. Additionally, the examples in FIGS. 3 and 4 show that the localization interface 102 may concurrently display the same process control objects in different locale contexts based on the same device description file 304 using different locale templates (e.g., the resource-based locale template 320 and the XML-formatted locale template 404).

Figure 5:
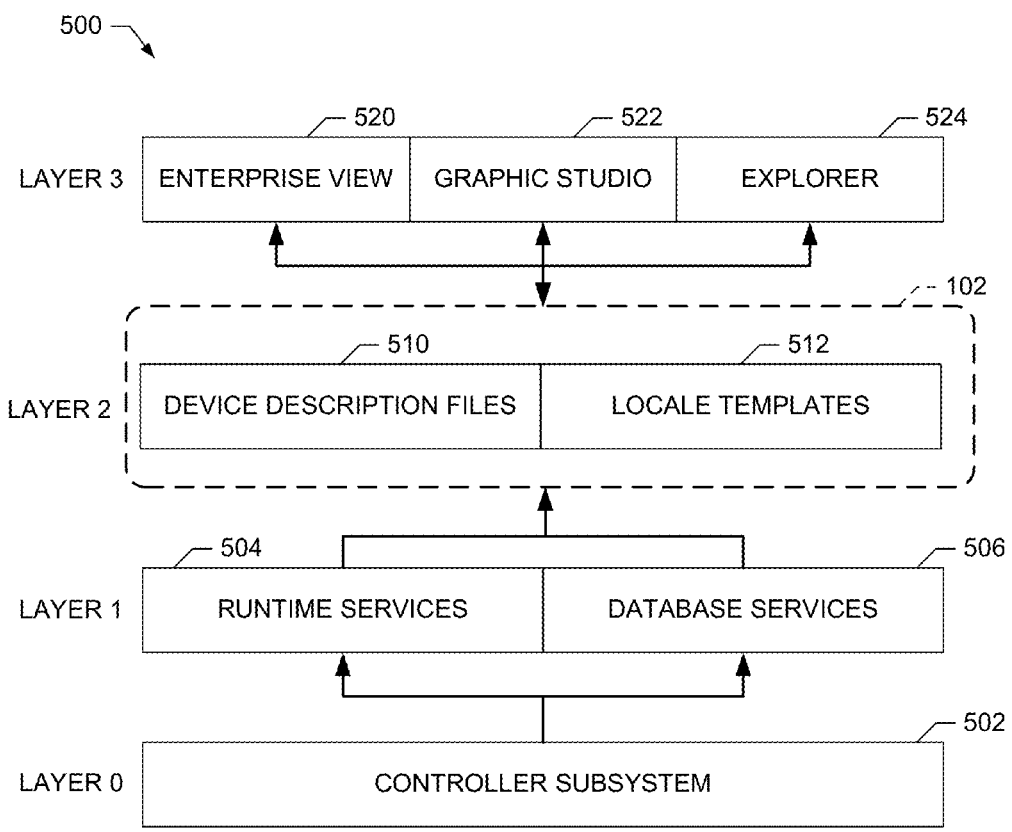
FIG. 5 shows an example process control architecture including the localization interface of FIGS. 1 and 2 for displaying localized process control objects.

FIG. 5 shows an example process control architecture 500 including the localization interface 102 for displaying localized process control objects. The process control architecture 500 includes functional layers (e.g., Layer 0-3) for generating a localized display based on process control information associated with requested process control objects. Other examples may include additional or fewer layers (e.g., a service layer or a security layer). In the Layer 0, a controller subsystem 502 (e.g., the controller 108) receives data (e.g., the outputs 116 of FIG. 1) from the field devices 112. The controller subsystem 502 includes a device network including network protocols and/or network services. The process control information is functionally transmitted from the controller subsystem 502 to the Layer 1.

The Layer 1 is a network application layer that includes runtime services 504 and database services 506. The runtime services 504 process received data from the field devices 112 within an algorithm and/or routine to generate process control information. The runtime services 504 may also include network messages for transmitting the process control information within the process control system 104. The Layer 1 also includes the database services 506 to store the generated process control information. The database services 506 may store the process control information within workstations (e.g., the workstation 106) and/or other servers within the process control system 104. The database services 506 may also store the process control information by an assigned identifier (e.g., a variable name). The data base services 506 may assign a data type to the process control information.

The Layer 2 is a translation layer that includes the localization interface 102, device description files 510, and locale templates 512. The Layer 2 (e.g., via the localization interface 102) accesses the process control information from the Layer 1 based on a specified request from a user. The localization interface 102 uses the device description files 510 to determine how the process control information is to be displayed (e.g., within a chart, text fields, bar-graphs, etc.). The localization interface 102 uses the locale templates 512 to access localized information including display format information to display the process control information in a specified locale context. The localization interface 102 renders the process control information for display. In this manner, the localization interface 102 operates as an application facade by implementing localized process control operations and/or network components as graphical representations requested by a user.

Functionally above the Layer 2, the Layer 3 includes applications 520-524 for displaying the process control objects localized and rendered by the localization interface 102. In the illustrated example, the applications 520-524 include the enterprise view application 520, the graphic studio application 522, and the explorer application 524. The enterprise view application 520 displays process control information within a monitoring context so that a user may view and/or modify an operational state of, for example, the field devices 112 and/or the process control system 104. The graphic studio application 522 is a design and simulation application that a user may utilize to configure, for example, the field devices 112 and/or the process control system 104. The explorer application 524 enables a user to search for and/or view process control objects and/or process control information.

The applications 520-524 transmit requests to the localization interface 102 in the Layer 2 for process control objects selected by a user. The localization interface 102 then uses the context of the request (e.g., a locale, a device type, and/or an application type) and the associated device description files 510 to select the appropriate locale templates 512 for displaying process control information associated with the requested process control object. The localization interface 102 transmits rendered process control information to the requesting application 520-524 within the Layer 3 for display.

Figure 6:
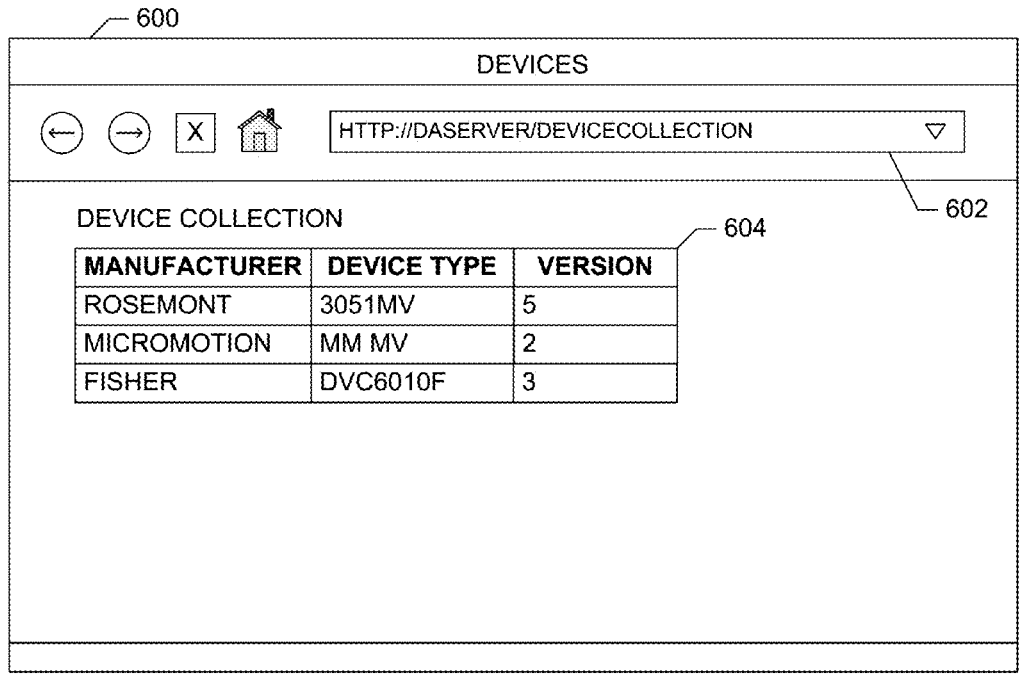
FIGS. 6 and 7 show an example user interface displaying a requested process control object as process control information within a web browser.
Figure 7:
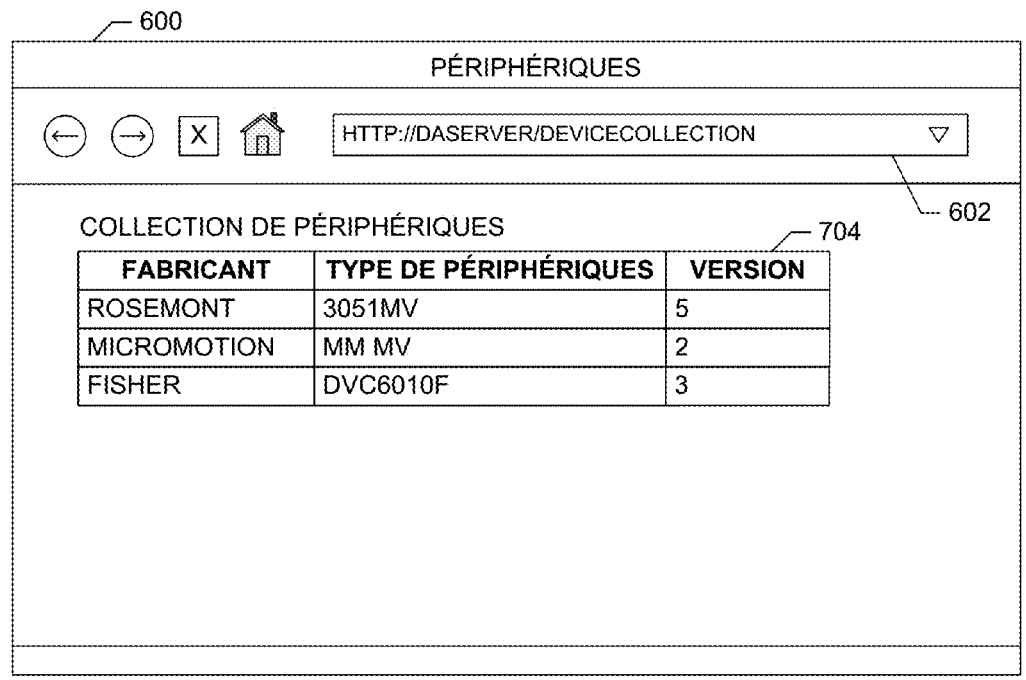

FIGS. 6 and 7 show an example user interface 600 displaying a requested process control object (e.g., DEVICE Collection) as process control information within a web browser. The user interface 600 includes a navigation bar 602 that a user may use to enter a file location and/or a path of a process control object. In this example, a user enters a 'HTTP://DASERVER/DEVICE/DEVICECOLLECTION' web address into the navigation bar 602, causing the user interface 600 to transmit a request to the localization interface 102 for the Device Collection process control object. The request also includes the web address, a locale associated with the user interface 600. The localization interface 102 searches for a device description file associated with the Device Collection process control object. In this example, because the request was transmitted from a web browser, the localization interface 102 searches for a device description file that is formatted for XML. The instructions below show the XML formatted file.

```
<?xml version="1.0" encoding="UTF-8"?>
<?xml-stylesheet type="text/xsl" href="file:///Ccd.xsl"?>
<catalog>
    <device>
        <manufacturer>Rosemount</manufacturer>
        <type>3051MV</type>
        <version>5</version>
    </device>
    <device>
        <manufacturer>Micromotion</manufacturer>
        <type>MM MV</type>
        <version>2</version>
    </device>
    <device>
        <manufacturer>Fisher</manufacturer>
        <type>DVC6010F</type>
        <version>3</version>
    </device>
</catalog>
```

The example device description XML file shown above lists the manufacturer, device type, and version of the three devices under the <catalog> line. To display this information in the user interface 600, the example localization interface 102 accesses the template database 132 for locale templates that match the locale associated with the request and include tags (e.g., <manufacturer>, <type>, <version>) that correspond to tags within the device description file. Within the device description file, the tags include process control information (e.g., Rosemount, 3051MV, 5) to be displayed as a list of devices associated with the Device Collection process control object. In this example, the localization interface 102 determines that the user is associated with an English locale and selects a set of English locale templates. Additionally, because the request was transmitted by a web browser, the localization interface 102 searches for XML and/or XSLT locale template files. An English locale XSLT locale template may include:

```
<?xml version="1.0" encoding="ISO-8859-1"?>
<!-- Edited by XMLSpy ® -->
<xsl:stylesheet version="1.0"
```

-continued

```
xmlns:xsl="http://www.w3.org/1999/XSL/Transform">
    <xsl:template match="/">
        <html>
            <body>
                <h2>My Device Collection</h2>
                <table border="1">
                    <tr bgcolor="#9acd32">
                        <th>Manufacturer</th>
                        <th>Device Type</th>
                        <th>Version</th>
                    </tr>
                    <xsl:for-each select="catalog/device">
                        <tr>
                            <td>
                                <xsl:value-of
                                    select="manufacturer"/>
                            </td>
                            <td>
                                <xsl:value-of select="type"/>
                            </td>
                            <td>
                                <xsl:value-of select="version"/>
                            </td>
                        </tr>
                    </xsl:for-each>
                </table>
            </body>
        </html>
    </xsl:template>
</xsl:stylesheet>
```

This XSLT locale template defines a table 604 including column headers (e.g., Manufacturer, Device Type, and Version) and instructions (e.g., <xsl:value-of select="manufacturer"/>, <xsl:value-of select="type"/>, and <xsl:value-of select="version"/>) for formatting the process control information into data fields. The localization interface 102 uses the XSLT template with the XML device description file to generate an HTML file displayable via the user interface 600. The example user interface 600 uses the HTML file to render and display the table 604 in FIG. 6.

FIG. 7 shows the user interface 600 of FIG. 6 in a French locale. In this example, a user may enter the same 'HTTP://DASERVER/DEVICE/DEVICECOLLECTION' web address as shown in FIG. 6. However, because the request includes a French locale, the localization interface 102 searches the template database 132 for French locale templates. An XSLT French locale template may include:

```
<?xml version="1.0" encoding="ISO-8859-1"?>
<!-- Edited by XMLSpy ® -->
<xsl:stylesheet version="1.0"
    xmlns:xsl="http://www.w3.org/1999/XSL/Transform">
    <xsl:template match="/">
        <html>
            <body>
                <h2> Collection de Périphériques </h2>
                <table border="1">
                    <tr bgcolor="#9acd32">
                        <th> Fabricant </th>
                        <th> Type de Périphériques </th>
                        <th>Version</th>
                    </tr>
                    <xsl:for-each select="catalog/device">
                        <tr>
                            <td>
                                <xsl:value-of
                                    select=" fabricant "/>
                            </td>
                            <td>
                                <xsl:value-of select="type"/>
                            </td>
                            <td>
                                <xsl:value-of
                                    select="version"/>
                            </td>
                        </tr>
                    </xsl:for-each>
                </table>
            </body>
        </html>
    </xsl:template>
</xsl:stylesheet>
```

Using this XSLT locale template, the localization interface 102 generates a table 704 defined by HTML instructions and transmits these instructions to the user interface 600 in FIG. 7. The user interface 600 then renders the HTML instructions to display the table 704. In this example, the French locale template changes the language of the table headers (e.g., > Fabricant, Type de Périphériques, and Version) and the title (e.g., Collection de Périphériques) of the table 704. As shown in FIGS. 6 and 7, two users may concurrently view the same process control information associated with the Device Collection process control object in a locale context associated with each for the users.

Figure 8:
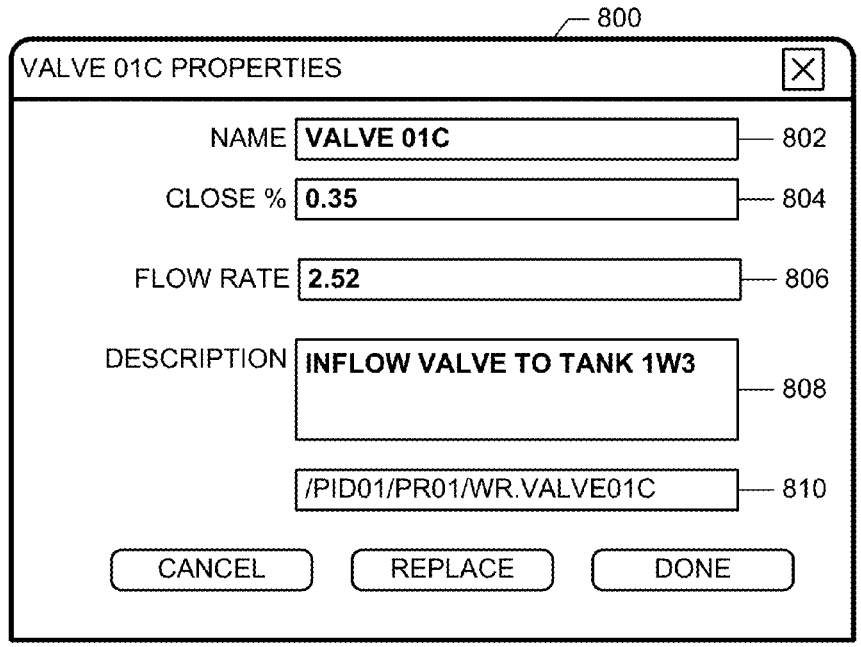
FIGS. 8 and 9 show example user interfaces with the same process control information in different localization contexts applied by the example localization interface of FIGS. 1 and 2.
Figure 9:
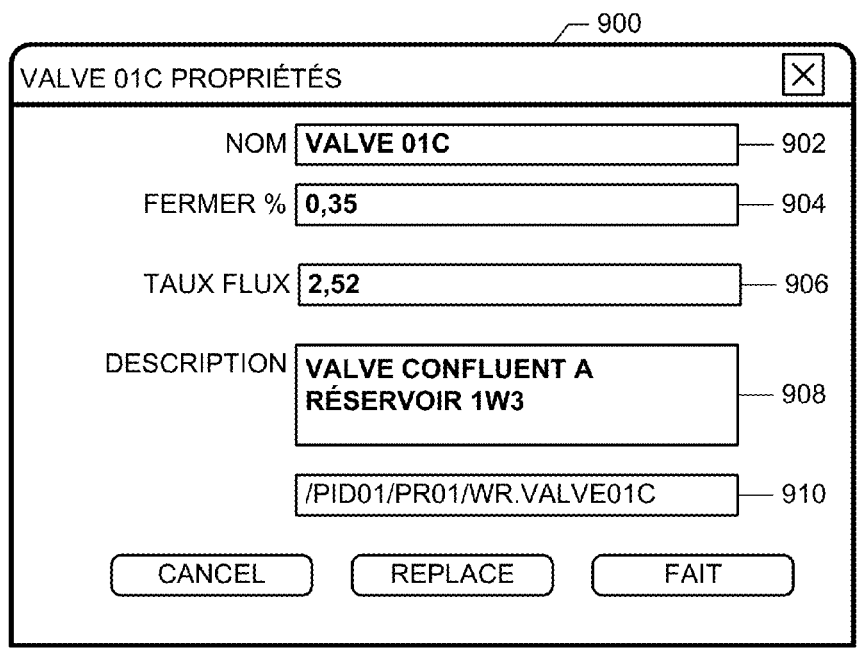

FIGS. 8 and 9 show example user interfaces 800 and 900 with the same process control information in different localization contexts applied by the example localization interface 102 of FIGS. 1 and/or 2. Specifically, the user interfaces 800 and 900 show properties associated with a valve (e.g., a field device) with an identifier of Valve 01C. While the example user interfaces 800 and 900 show the process control information within data fields 802-810 and 902-910, other user interfaces may display process control data within other types of graphical representations including, for example, charts, bar-graphs, images, schematics, layout diagrams, status indicators, gauges, etc.

The example user interface 800 of FIG. 8 is shown in the English language and includes the data fields 802-810. The example user interface 900 of FIG. 9 is shown in the French language and includes the data fields 902-910. The data fields 802 and 902 specify a name of the valve, the data fields 804 and 904 specify a closure percentage of the valve, the data fields 806 and 906 specify a fluid flow rate through the valve, the data fields 808 and 908 specify a description of the valve, and the data fields 810 and 910 specify a file location of the process control information associated with the valve.

In the example of FIG. 8, the example localization interface 102 determines that a user requested process control information associated with the Valve 01C process control object and displays localization information in an English context. The localization interface 102 locates a device description file associated with the Valve 01C process control object. The localization interface 102 then uses tags referenced to text strings within corresponding English locale templates (e.g., NAME, VALVE 01C, CLOSE %, FLOW RATE, DESCRIPTION, INFLOW VALVE TO TANK 1W3, CANCEL, REPLACE, and/or DONE) that provide descriptions of corresponding process control information generated by the VALVE01C field device. The English locale templates also includes the file location (e.g., /PID01/PR01/WR.VALVE01C) that points to a location of corresponding process control information processed by the controller 108. In this example, the process control information may include the values 0.35 and 2.52 transmitted by the Valve 01C field device. Additionally, because the user interface 800 may be associated with an enterprise application (e.g., a process control software application), the localization interface 102 may search for locale templates that have a resource file format.

In the example of FIG. 9, the localization interface 102 determines that a user is associated with a French locale. As a result, the localization interface 102 displays the process control information formatted to conform to the European numbering standard within the data fields 904 and 906 and includes localized text information within the data field 908. However, the localization interface 102 utilizes the same device description file for the user interface 900 used to display the Valve 01C process control object in the English language in FIG. 8. Additionally, the localization interface 102 in FIG. 9 accesses the process control information displayed within the data fields 904-908 from the controller 108 and formats the data based on information within the French locale templates. The localization interface 102 may also use the translator 214 of FIG. 2 to translate the text within the field 908. Alternatively, the translated text may be included within a French locale template. Further, the localization interface 102 uses translated text within French locale templates for the text (e.g., Nom, Fermer %, Taux Flux, and Description) adjacent to the data fields 902-908.

In some examples, the layout of the localized information displayed via the user interfaces 800 and 900 may be based on relative positioning and/or automatic sizing of the data fields 802-810 and 902-910 specified within the respective locale templates. Further, the layout of the data fields 802-810 and 902-910 may include extra space so that longer localizable phrases are not obscured. Moreover, the layout of the data fields 802-810 and 902-910 may include text wrapping to prevent clipping. Additionally, an XML language attribute may be set for the user interfaces 800 and 900 of FIGS. 8 and 9 so that hyphenation, spell checking, number substitution, script shaping, and/or font fallback are associated with a specified locale. Also, each of the user interfaces 800 and 900 may specify a composite font and a text flow direction for displaying the text strings.

Figure 10:
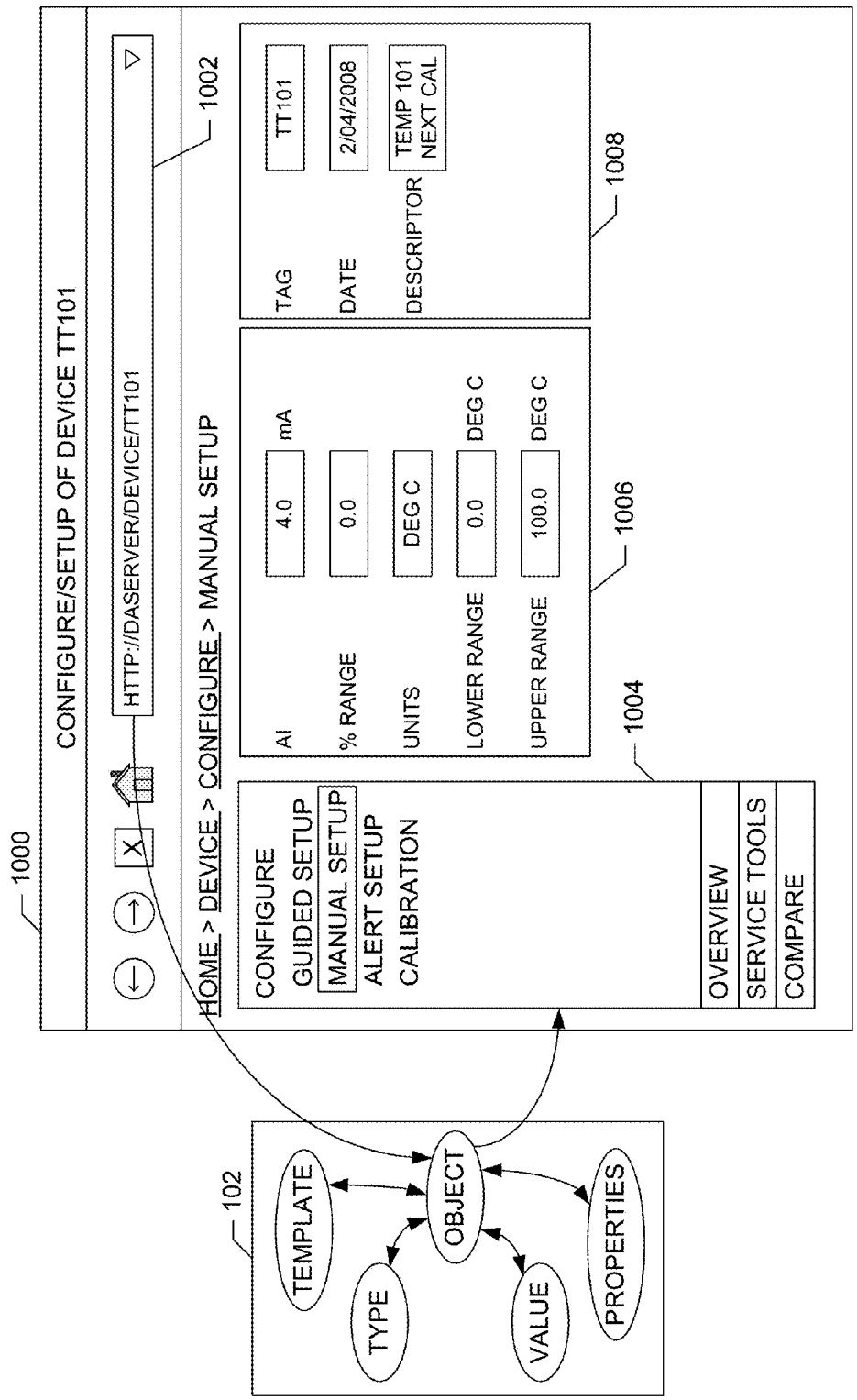
FIG. 10 shows an example user interface communicating with the example localization interface of FIGS. 1 and 2 to display process control information associated with a process control object in a web browser.

FIG. 10 shows an example user interface 1000 communicating with the example localization interface 102 to display process control information associated with a TT101 process control object in a web browser application. The example user interface 1000 includes a navigation bar 1002 that a user may utilize to enter the TT101 field device name (e.g., the process control object) to view process control information associated with the field device. In another example, a user may use a hierarchical directory to locate a field device. The user interface 1000 also includes a menu bar 1004 that includes options for interfacing with the TT101 field device. In this example, a Manual Setup option is selected. The options listed in the menu bar 1004 may be specified within a device description file associated with the TT101 field device.

The example user interface 1000 of FIG. 10 sends target display information included within a request to view process control information associated with the TT101 field device to the localization interface 102. The localization interface 102 locates the device description file associated with the TT101 field device and locates corresponding English locale templates. The localization interface 102 uses the target display information (e.g., device type information) to search for locale templates that specify which process control information associated with the TT101 field device is to be displayed within a web browser on a workstation or laptop. Also, the localization interface 102 uses the target display information to identify English locale templates that are configured for display on a workstation and/or laptop. Because the request was transmitted via a web browser, the localization interface 102 may select XML and/or XSLT-formatted locale templates to display the process control information in an HTML format.

Additionally, the example localization interface 102 uses the TT101 process control object to search for process control information and/or properties (e.g., information) to display within data panels 1006 and 1008 as outputs from the TT101 field device. The data panels 1006 and 1008 include the data fields for analog input (AI), % Range, Units, Lower Range, Upper Rage, Tag, Date, and Descriptor of the TT101 field device. The example localization interface 102 insets this process control information into the appropriate data fields based on formatting information and references (e.g., tags, paths, and/or links to the process control information) within the locale templates. The localization interface 102 may then transmit to the user interface 1000 instructions for rendering and displaying the process control information within the data panels 1006 and 1008.

FIGS. 11 and 12 show an example user interface 1100 displayed on the wireless device 107 of FIG. 1. In this example, the wireless device 107 is communicatively coupled to the localization interface 102 of FIGS. 1 and 2. In FIG. 11, the user interface 1100 includes a process control object search field 1102 and a keyboard 1104. The process control object search field 1102 enables a user to enter an identifier of a process control object (e.g., OPC DA/DEVICE/TT101) via the keyboard 1104. The user interface 1100 transmits a request for the TT101 process control object to the localization interface 102. Additionally, the wireless device 107 transmits target display information and/or locale information to the localization interface 102.

The localization interface 102 uses the TT101 process control object to locate a corresponding device description file, locale template(s), and/or process control information. Also, the example localization interface 102 uses the target display information to select one or more locale templates formatted for display on the relatively small screen of the wireless device 107. Further, the localization interface 102 may select locale template(s) that match an English locale associated with the wireless device 107. In the illustrated example, the localization interface 102 receives the same TT101 field device identifier as described in conjunction with FIG. 10. However, because the request is from the wireless device 107 in FIG. 11 with a relatively small screen compared to the web browser user interface 1000 in FIG. 10, the localization interface 102 generates a display formatted for the relatively smaller screen of the user interface 1100.

FIG. 12 shows the generated display from the localization interface 102. In this example, the wireless device 107 may render the display based on instructions from the localization interface 102. In other examples, the localization interface 102 may render and transmit the display to the wireless device 107. The display within the user interface 1100 of FIG. 12 includes a menu panel 1202 for navigating to different functions associated with the TT101 field device. In some examples, the items listed within the menu panel 1202 may be specified within a device description file for the TT101 field device. The user interface 1100 also includes a process data panel 1204 showing process control information associated with the TT101 field device that is formatted for display via the wireless device 107 and formatted for display in a localization context of the user.

Figure 13A:
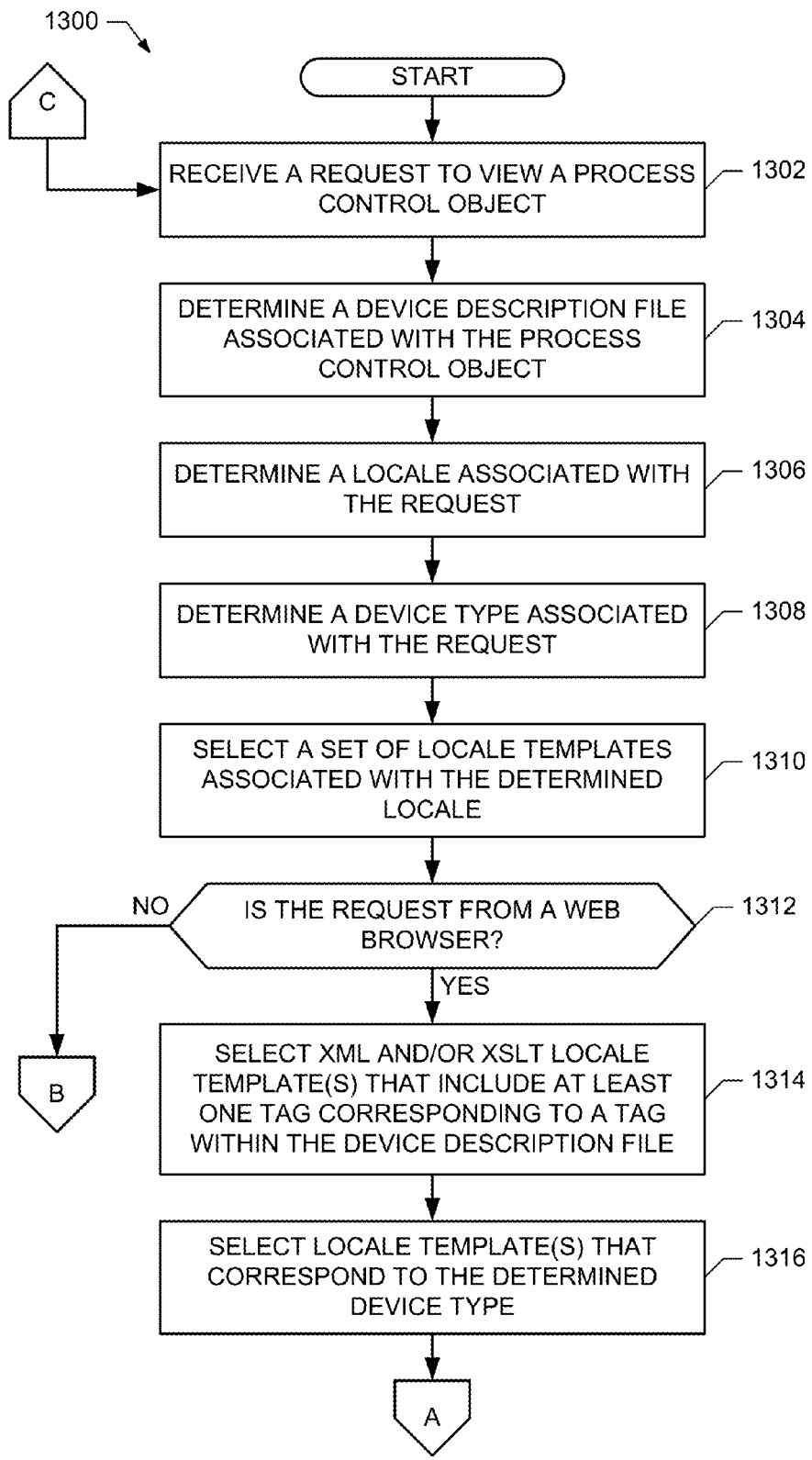
FIGS. 13A, 13B, and 14 are flowcharts of example processes that may be used to implement the localization interface of FIGS. 1 and/or 2.
Figure 13B:
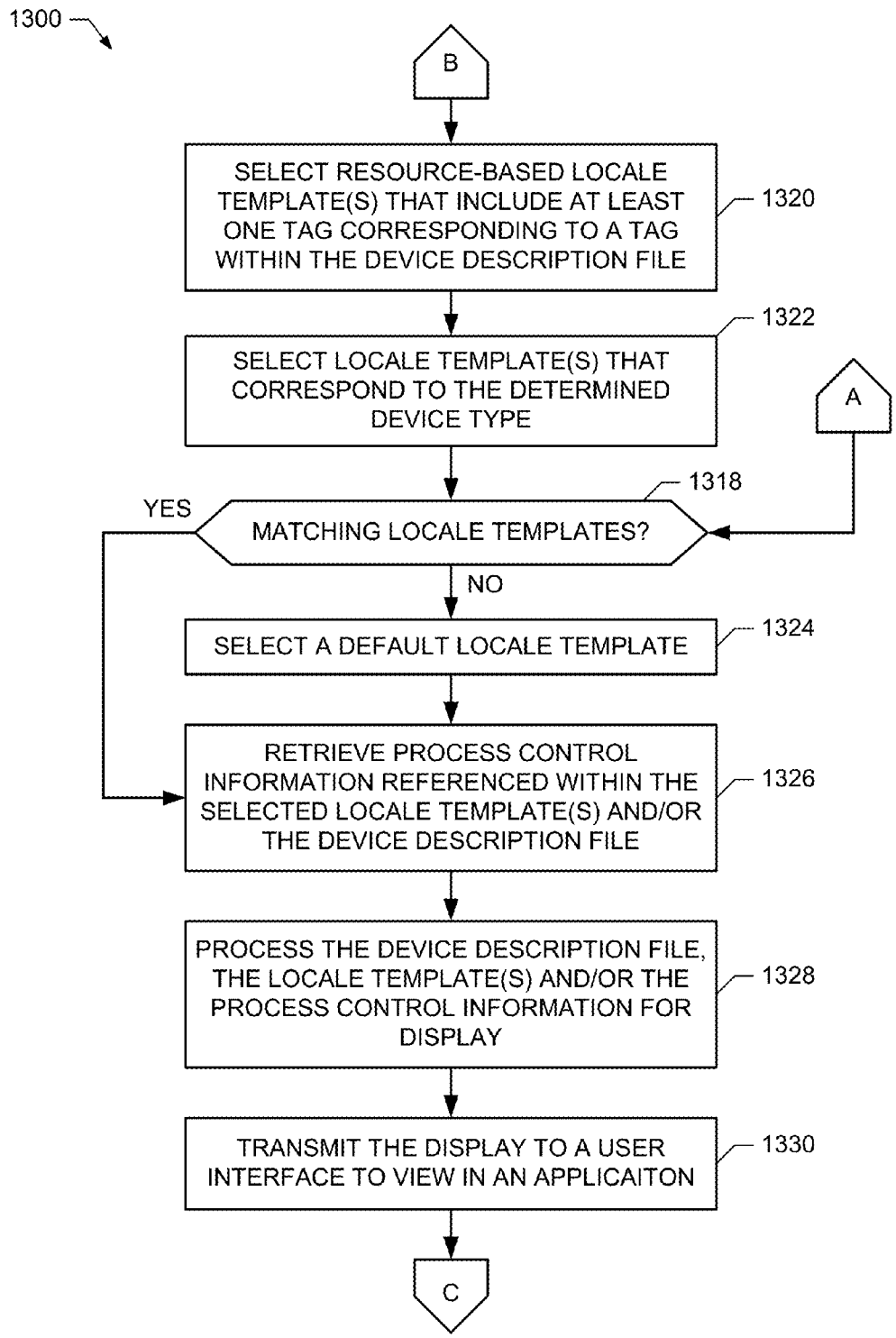
Figure 14:
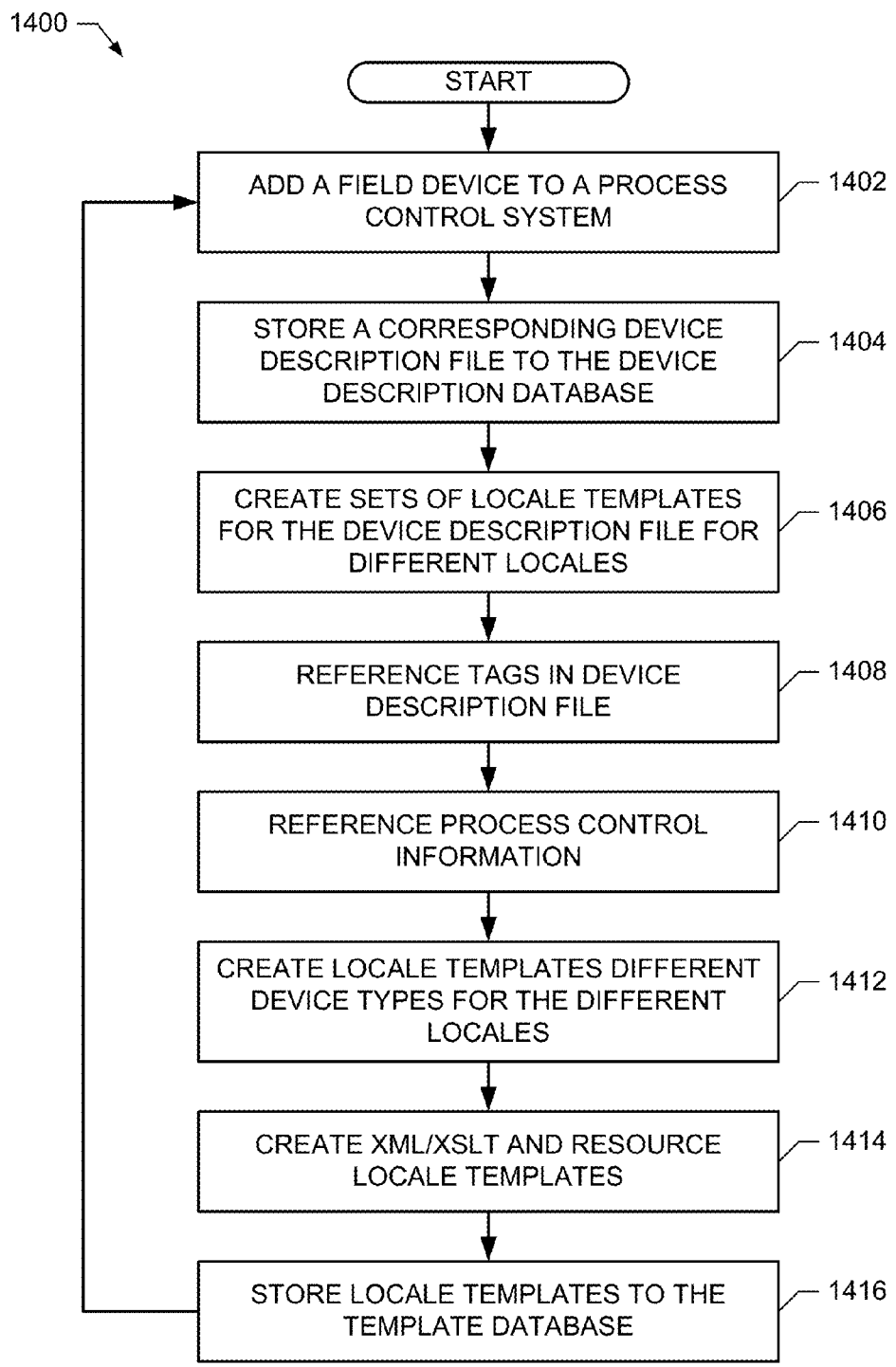

Flowcharts representative of example processes 1300 and 1400 for implementing the localization interface 102 of FIGS. 1 and 2 are shown in FIGS. 13A, 13B, and 14. In this example, the processes may be implemented using the machine readable instructions in the form of a program for execution by a processor such as the processor P12 shown in the example processor system P10 discussed below in connection with FIG. 15. The program may be embodied in software stored on a computer readable medium such as a CD-ROM, a floppy disk, a hard drive, a digital versatile disk (DVD), or a memory associated with the processor P12, but the entire program and/or parts thereof could alternatively be executed by a device other than the processor P12 and/or embodied in firmware or dedicated hardware. Further, although the example program is described with reference to the flowcharts illustrated in FIGS. 13A, 13B, and 14, many other methods of implementing the example localization interface 102 may alternatively be used. For example, the order of execution of the blocks may be changed, and/or some of the blocks described may be changed, eliminated, or combined.

As mentioned above, the example processes of FIGS. 13A, 13B, and 14 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 13A, 13B, and 14 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporary buffering, and/or for caching of the information). As used herein, the term non-transitory computer readable medium is expressly defined to include any type of computer readable medium and to exclude propagating signals.

The example process 1300 of FIGS. 13A and 13B displays a process control object and/or displays process control information requested by a user. The example process 1300 of FIG. 13A begins by receiving a request to view a process control object from an application displayed via a user interface (e.g., via the workstation interface 202 of FIG. 2) (block 1302). The example process 1300 then locates a device description file that corresponds to the requested process control object (e.g., via the device description file processor 204) (block 1304). The example process 1300 next determines a locale and a device type associated with the request (e.g., via the object manager 206 and/or the template processor 208) (blocks 1306 and 1308). The locale and/or the device type may be determined based on metadata included within the request.

The example process 1300 uses the determined locale to select a set of locale templates associated with the determined locale (e.g., via the template processor 208) (block 1310). The example process 1300 then determines if the request is from a web browser (e.g., via the workstation interface 202 and/or the object manager 206) (block 1312). In other examples, the process 1300 may determine if the request is from a web browser upon receiving the request. If the request is from a web browser, the example process 1300 selects XML and/or XSLT locale template(s) that include at least one tag that corresponds to tag(s) within the determined device description file (e.g., via the template processor 208) (block 1314). By selecting XML and/or XSLT formatted locale templates, the example processor 1300 may generate an HTML file to display the requested process control object. The example process 1300 then selects locale template(s) from with the selected XML and/or XSLT locale templates that correspond to the determined device type (e.g., via the template processor 208) (block 1316). The example process 1300 of FIG. 3B continues by checking if there is at least one locale template to display localized information (e.g., via the template processor 208) (block 1318).

However, if the request is not from a web browser (block 1312), the example process 1300 of FIG. 13A selects resource-based locale template(s) that include at least one tag that corresponds to tag(s) within the determined device description file (e.g., via the template processor 208) (block 1320). The example process 1300 then selects locale template (s) from within the selected resource-based locale templates that correspond to the determined device type (e.g., via the template processor 208) (block 1322). The example process 1300 of FIG. 3B then determines if there is at least one locale template to display localized information (e.g., via the template processor 208) (block 1318).

If there are no matching locale templates to the device type, locale, and/or tag(s) of the device description file, the example process 1300 selects a default locale template (e.g., via the template processor 208) (block 1324). The example process 1300 then retrieves process control information referenced within the selected locale template(s) and/or the device description file (e.g., via the object manager 206) (block 1326). The example process 1300 next processes the device description file, the locale template(s), and/or the retrieved process control information for display as the requested process control object (e.g., via the object manager 206 and/or the renderer 210) (block 1328). Processing may include rendering the device description file, the locale template(s), and/or the retrieved process control information for display. In other examples, a target user interface may render the processed display information from the example process 1300.

The example process 1300 continues by transmitting the processed and/or rendered display to a user interface to view within an application (e.g., via the application interface 212) (block 1330). The example process 1300 may then return to receiving a request to view a process control object. In other examples, the example process 1300 may execute multiple requests concurrently.

The example process 1400 of FIG. 14 generates a device description file and locale template(s) to support a newly added field device. The example process 1400 begins by receiving information that a field device has been added to a process control system (e.g., via the database manager 216) (block 1402). The information may be entered by process control personnel or, alternatively, the example process 1400 may detect the addition of the field device. The example process 1400 next stores a device description file associated with the field device to the device description database 130 of FIGS. 1 and 2 (e.g., via the database manager 216) (block 1404). In some examples, the process 1400 may receive the device description file from the field device via the controller 108. In other examples, process control personnel may provide the device description file.

The example process 1400 of the illustrated example then creates set(s) of locale templates for the device description file for different locales (e.g., via the database manager 216) (block 1406). In some examples, a set of locale templates may be created for a default locale. The example process 1400 may then generate sets for other locales using a translator. In other examples, process control personnel may create sets for each of the desired locales. The example process 1400 may create the set(s) of locale templates by adding tags with localized information to the locale templates that reference tags within the device description file (e.g., via the database manager 216) (block 1408). The example process 1400 may also create set(s) of locale templates by adding references and/or links to process control information (e.g., via the database manager 216) (block 1410).

Additionally, the example process 1400 creates for each of the set(s) locale templates that are configured and/or formatted for display on different device types (e.g., via the database manager 216) (block 1412). Further, the example process 1400 may create locale templates for each of the set(s) that are formatted for XML files, XSLT files, and/or resource-based files (e.g., via the database manager 216) (block 1414). The example process 1400 then stores the created locale templates to the template database 132 (e.g., via the database manager 216) (block 1416). The example process 1400 next returns to receiving information that another field device has been added to the process control system. In other examples, the process 1400 may terminate if there are no additional field devices to add to the process control system.

Figure 15:
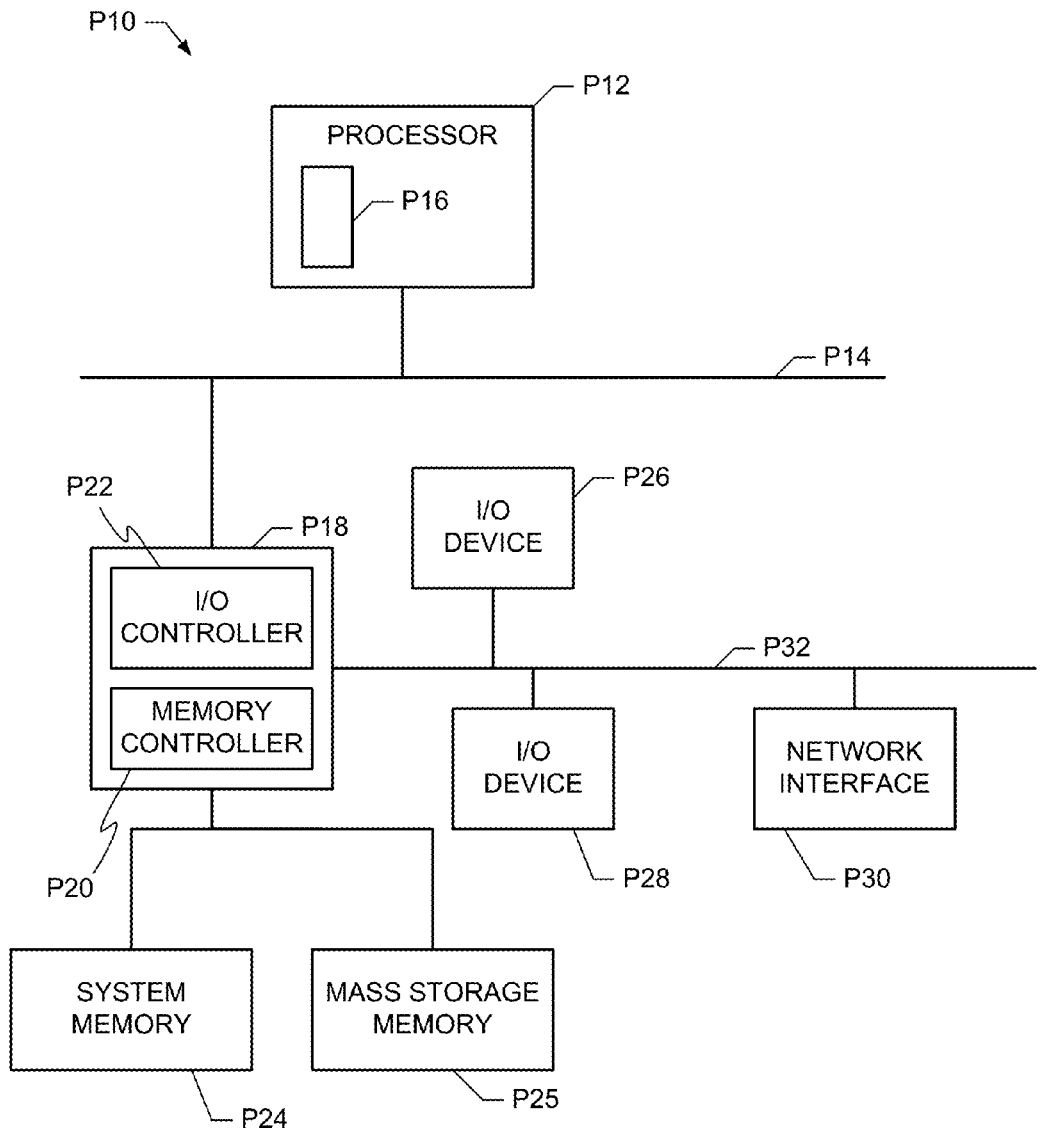
FIG. 15 is a block diagram of an example processor system that may be used to implement the example methods and apparatus described herein.

FIG. 15 is a block diagram of an example processor system P10 that may be used to implement the example methods and apparatus described herein. For example, processor systems similar or identical to the example processor system P10 may be used to implement the example workstation interface 202, the example device description file processor 204, the example object manager 206, the example template processor 208, the example renderer 210, the example application interface 212, the example translator 214, the example database manager 216 and/or, more generally, the example localization interface 102 of FIGS. 1 and/or 2. Although the example processor system P10 is described below as including a plurality of peripherals, interfaces, chips, memories, etc., one or more of those elements may be omitted from other example processor systems used to implement one or more of the example workstation interface 202, the example device description file processor 204, the example object manager 206, the example template processor 208, the example renderer 210, the example application interface 212, the example translator 214, the example database manager 216 and/or, more generally, the example localization interface 102.

As shown in FIG. 15, the processor system P10 includes a processor P12 that is coupled to an interconnection bus P14. The processor P12 includes a register set or register space P16, which is depicted in FIG. 15 as being entirely on-chip, but which could alternatively be located entirely or partially off-chip and directly coupled to the processor P12 via dedicated electrical connections and/or via the interconnection bus P14. The processor P12 may be any suitable processor, processing unit or microprocessor. Although not shown in FIG. 15, the system P10 may be a multi-processor system and, thus, may include one or more additional processors that are identical or similar to the processor P12 and that are communicatively coupled to the interconnection bus P14.

The processor P12 of FIG. 15 is coupled to a chipset P18, which includes a memory controller P20 and a peripheral input/output (I/O) controller P22. As is well known, a chipset typically provides I/O and memory management functions as well as a plurality of general purpose and/or special purpose registers, timers, etc. that are accessible or used by one or more processors coupled to the chipset P18. The memory controller P20 performs functions that enable the processor P12 (or processors if there are multiple processors) to access a system memory P24 and a mass storage memory P25.

The system memory P24 may include any desired type of volatile and/or non-volatile memory such as, for example, static random access memory (SRAM), dynamic random access memory (DRAM), flash memory, read-only memory (ROM), etc. The mass storage memory P25 may include any desired type of mass storage device. For example, if the example processor system P10 is used to implement device description database 130 and/or the template database 132 (FIGS. 1 and 2), the mass storage memory P25 may include a hard disk drive, an optical drive, a tape storage device, etc. Alternatively, if the example processor system P10 is used to implement the device description database 130 and/or the template database 132, the mass storage memory P25 may include a solid-state memory (e.g., a flash memory, a RAM memory, etc.), a magnetic memory (e.g., a hard drive), or any other memory suitable for mass storage in the device description database 130 and/or the template database 132.

The peripheral I/O controller P22 performs functions that enable the processor P12 to communicate with peripheral input/output (I/O) devices P26 and P28 and a network interface P30 via a peripheral I/O bus P32. The I/O devices P26 and P28 may be any desired type of I/O device such as, for example, a keyboard, a display (e.g., a liquid crystal display (LCD), a cathode ray tube (CRT) display, etc.), a navigation device (e.g., a mouse, a trackball, a capacitive touch pad, a joystick, etc.), etc. The network interface P30 may be, for example, an Ethernet device, an asynchronous transfer mode (ATM) device, an 802.11 device, a DSL modem, a cable modem, a cellular modem, etc. that enables the processor system P10 to communicate with another processor system.

While the memory controller P20 and the I/O controller P22 are depicted in FIG. 15 as separate functional blocks within the chipset P18, the functions performed by these blocks may be integrated within a single semiconductor circuit or may be implemented using two or more separate integrated circuits.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or systems described herein.

It should also be noted that the example software and/or firmware implementations described herein are stored on a tangible storage medium, such as: a magnetic medium (e.g., a magnetic disk or tape); a magneto-optical or optical medium such as an optical disk; or a solid state medium such as a memory card or other package that houses one or more read-only (non-volatile) memories, random access memories, or other re-writable (volatile) memories. Accordingly, the example software and/or firmware described herein can be stored on a tangible storage medium such as those described above or successor storage media. To the extent the above specification describes example components and functions with reference to particular standards and protocols, it is understood that the scope of this patent is not limited to such standards and protocols.

Additionally, although this patent discloses example methods and apparatus including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example methods, systems, and machine-accessible medium, the examples are not the only way to implement such systems, methods and machine-accessible medium. Therefore, although certain example methods, systems, and machine-accessible medium have been described herein, the scope of coverage of this patent is not limited thereto. On the contrary, this patent covers all methods, systems, and machine-accessible medium fairly falling within the scope of the appended claims either literally or under the doctrine of equivalents.

What is claimed is:

1. A method to display localized process control objects, the method comprising:
   in response to a request to monitor a process control object associated with a process control system, selecting a device description file based on the process control object, the device description file including a first tag and instructions for displaying information generated by the process control object;
   selecting a set of locale templates based on a locale associated with the request, wherein each of the locale templates includes a reference to process control information;
   selecting a locale template from the set of locale templates by:
       determining which of the set of locale templates includes a second tag matching the first tag;
       identifying a type of the process control object; and
       matching the type to the locale template by identifying an indicator that specifies the locale template is configured to display the type of the process control object; and
   processing, via a logic circuit, the process control object for display by inserting portions of the selected locale template into the first tag in the device description file.

2. A method as defined in claim 1, further comprising transmitting instructions for displaying the process control object according to the selected locale template to an application that transmitted the request.

3. A method as defined in claim 2, further comprising displaying via the application the process control object according to the selected locale template.

4. A method as defined in claim 1, wherein the request includes locale information including at least one of a language type, a numeric format, an Internet Protocol address, a data format, a country, a region, or a dialect.

5. A method as defined in claim 4, wherein selecting the set of locale templates includes:
   identifying the locale information associated with the request; and
   matching the identified locale information to the set of locale templates.

6. A method as defined in claim 1, wherein the set of locale templates includes templates associated with a single locale.

7. A method as defined in claim 1, further comprising:
   determining at least one resource associated with the process control object;
   selecting the locale template based on a type of the at least one resource; and
   processing the at least one resource for display within the selected locale template.

8. A method as defined in claim 7, wherein the at least one resource includes at least one of a process control value, a data value, an alarm, text, status information, diagnostic information, an error message, a parameter, an event, or a device identifier.

9. A method as defined in claim 1, wherein processing the process control object for display includes rendering data related to the process control object.

10. A method as defined in claim 1, wherein the locale template is a locale resource file that includes translated information.

11. A method as defined in claim 1, further comprising translating the locale template prior to processing the process control object for display.

12. A method as defined in claim 1, wherein the locale template is at least one of an Extensible Stylesheet Language Transformation file or an Extensible Markup Language file.

13. A method as defined in claim 12, wherein processing the process control object for display includes converting the at least one of the Extensible Markup Language file or the Extensible Stylesheet Language Transformation into a HyperText Markup Language using the device description file for display via a web browsing application that initiated the request.

14. A method as defined in claim 1, wherein the device description file is an Electronic Device Description Language file that includes a description of functionality associated with the process control object for at least one of general information, diagnostics, performance analysis, operational statistics, parameterization, range, simulation, override, calibration trim, monitoring, security, or reset.

15. A method as defined in claim 1, further comprising identifying the locale based on a dialect of the request.

16. A method as defined in claim 1, further comprising identifying the locale based on a numeric pattern in the request.

17. An apparatus to display localized process control objects, the apparatus comprising:
   a device description file processor to select a device description file based on a request to monitor a process control object, the device description file including a first tag and instructions for displaying information generated by the process control object;
   a template processor to:
       select a set of locale templates based on a locale associated with the request, wherein each of the locale templates includes a reference to process control information; and
       select a locale template from the set of locale templates by:
           determining which of the set of locale templates includes a second tag matching the first tag;
           identifying a type of the process control object; and
           matching the type to the locale template by identifying an indicator that specifies the locale template is configured to display the type of the process control object; and
   an object manager to process the process control object for display by combining the selected locale template with the device description file, wherein at least one of the device description file processor, the template processor or the object manager is implemented via a logic circuit.

18. An apparatus as defined in claim 17, wherein the object manager is to combine the selected locale template with the device description file by:

matching portions of the selected locale template to the first tag in the device description file;

inserting the matching portions of the locale template into the first tag in the device description file; and operating the device description file with the inserted portions of the locale template.

19. An apparatus as defined in claim 17, further comprising an interface to receive the request to view the process control object from an application via a user interface.

20. An apparatus as defined in claim 19, further comprising an application interface to transmit instructions for displaying the process control object according to the selected locale template via the application.

21. An apparatus as defined in claim 17, wherein the template processor is to select the set of locale templates by:

identifying locale information associated with the request; and matching the identified locale information to the set of locale templates.

22. An apparatus as defined in claim 17, wherein the object manager is to:

determine at least one resource associated with the process control object;

access a controller for the at least one resource;

receive from the template processor the locale template based on a type of the at least one resource; and process the at least one resource for display within the selected locale template.

23. An apparatus as defined in claim 17, further comprising a renderer to render data related to the process control object for display.

24. An apparatus as defined in claim 17, further comprising a translator to translate the locale template prior to processing the process control object for display.

25. A tangible machine readable storage medium comprising instructions that, when executed, cause a machine to at least:

in response to a request to monitor a process control object associated with a process control system, select a device description file based on the process control object, the device description file including a first tag and instructions for displaying information generated by the process control object;

select a set of locale templates based on a locale associated with the request, wherein each of the locale templates includes a reference to process control information;

select a locale template from the set of locale templates by:
determining which of the set of locale templates includes a second tag matching the first tag;
identifying a type of the process control object; and
matching the type to the locale template by identifying an indicator that specifies the locale template is configured to display the type of the process control object; and process the process control object for display by inserting portions of the selected locale template into the tag in the device description file.

\* \* \* \* \*